US012766768B2

(12) United States Patent
Petri et al.

(10) Patent No.: US 12,766,768 B2
(45) Date of Patent: Oct. 20, 2026

(54) FILTER MEDIA AND RELATED FOAM FORMING METHODS

(71) Applicant: Hollingsworth & Vose Company, East Walpole, MA (US)

(72) Inventors: Thomas Petri, Breidenbach (DE); Julia Anuscha Kronawitt, Marburg (DE); Michael Arnulf Hermann Neukirch, Cologne (DE)

(73) Assignee: Hollingsworth & Vose Company, East Walpole, MA (US)

( * ) Notice: Subject to any disclaimer, the term of this patent is extended or adjusted under 35 U.S.C. 154(b) by 159 days.

(21) Appl. No.: 18/326,932

(22) Filed: May 31, 2023

(65) Prior Publication Data

US 2024/0399631 A1 Dec. 5, 2024

(51) Int. Cl.

| | |
|---|---|
| ***B29C 44/28*** | (2006.01) |
| ***B01D 39/16*** | (2006.01) |
| ***B29C 44/32*** | (2006.01) |
| *B29L 31/14* | (2006.01) |

(52) U.S. Cl.

CPC .......... *B29C 44/28* (2013.01); *B01D 39/1607* (2013.01); *B01D 39/1676* (2013.01); *B29C 44/32* (2013.01); *B29L 2031/14* (2013.01)

(58) Field of Classification Search

CPC ........................... B29C 44/28; B01D 39/1607; B01D 2239/10; B29L 2031/14

See application file for complete search history.

(56) References Cited

U.S. PATENT DOCUMENTS

| | | | | |
|---|---|---|---|---|
| 5,580,459 | A | 12/1996 | Powers et al. | |
| 5,672,399 | A | 9/1997 | Kahlbaugh et al. | |
| 5,785,725 | A | 7/1998 | Cusick et al. | |
| 6,171,684 | B1 | 1/2001 | Kahlbaugh et al. | |
| 6,531,078 | B2 | 3/2003 | Laine et al. | |
| 7,008,465 | B2 | 3/2006 | Graham et al. | |
| 7,137,510 | B1 | 11/2006 | Klein et al. | |
| 7,314,497 | B2 | 1/2008 | Kahlbaugh et al. | |
| 7,416,636 | B2 | 8/2008 | Blomqvist et al. | |
| 2004/0255783 | A1* | 12/2004 | Graham | B01D 46/10 55/528 |
| 2006/0096263 | A1* | 5/2006 | Kahlbaugh | B01D 46/71 55/528 |
| 2017/0232371 | A1* | 8/2017 | Anantharamaiah | B01D 39/1623 55/528 |
| 2019/0009194 | A1* | 1/2019 | Goodby | D04H 1/728 |

(Continued)

FOREIGN PATENT DOCUMENTS

| | | | |
|---|---|---|---|
| CN | 102151435 | B | 5/2013 |
| FI | 20205988 | A1 | 4/2022 |
| JP | 4994446 | B2 | 8/2012 |

(Continued)

OTHER PUBLICATIONS

Invitation to Pay Additional Fees for International Application No. PCT/US2024/031550 dated Jul. 16, 2024.

(Continued)

*Primary Examiner* — Nahida Sultana
*Assistant Examiner* — Debjani Roy
(74) *Attorney, Agent, or Firm* — Wolf, Greenfield & Sacks, P.C.

(57) ABSTRACT

Filter media and related methods of foam forming the filter media are generally described herein.

21 Claims, 6 Drawing Sheets

(56) References Cited

U.S. PATENT DOCUMENTS

2021/0387122 A1 12/2021 Gu et al.

FOREIGN PATENT DOCUMENTS

| | | | |
|---|---|---|---|
| JP | 5465605 | B2 | 4/2014 |
| WO | WO 2022/074611 | A1 | 4/2022 |

OTHER PUBLICATIONS

Notification of Decision Concerning Request for Rectification for International Application No. PCT/US2024/031550 dated Sep. 24, 2024.
Fortea-Verdejo et al., Foaming of oxidized nanocellulose for the preparation of high-flux water filters. Monat fur Chemie Chem Month. Dec. 8, 2022;154:523-32.
International Search Report and Written Opinion for International Application No. PCT/US2024/031550 dated Oct. 16, 2024.
Wang et al., Novel filter material by glass fiber foam laying for nonwoven fabrics. J Ind Text. Aug. 2023;53:1-13.

* cited by examiner

FILTER MEDIA AND RELATED FOAM FORMING METHODS

TECHNICAL FIELD

Filter media and related methods of foam forming the filter media are generally described herein.

BACKGROUND

Filter media may be employed in a variety of applications. For instance, filter media may be employed to remove contaminants from fluids (e.g., liquids and/or gases). Some filter media fabricated by wetlaid processes may exhibit undesirable properties, such as low pore permeability indexes and low dust holding capacities.

Accordingly, improved filter media fabrication processes are needed.

SUMMARY

Filter media and related methods of foam forming the filter media are generally described herein.

According to certain embodiments, a method of fabricating a filter media is described. In some embodiments, the method comprises providing a fiber dispersion; adding one or more foaming additives to the fiber dispersion; forming a foam slurry comprising the fiber dispersion; applying the foam slurry onto a carrier; and drying the foam slurry, thereby providing the filter media.

According to some embodiments, a filter media is described. In certain embodiments, the filter media comprises a fiber web comprising a plurality of pores, wherein the filter media has a pore permeability index (PPI) of greater than or equal to 0.2 and less than or equal to 4.0, and wherein greater than or equal to 5% of pores of the plurality of pores have an average size of less than or equal to 1 micrometer.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Figure 1A:
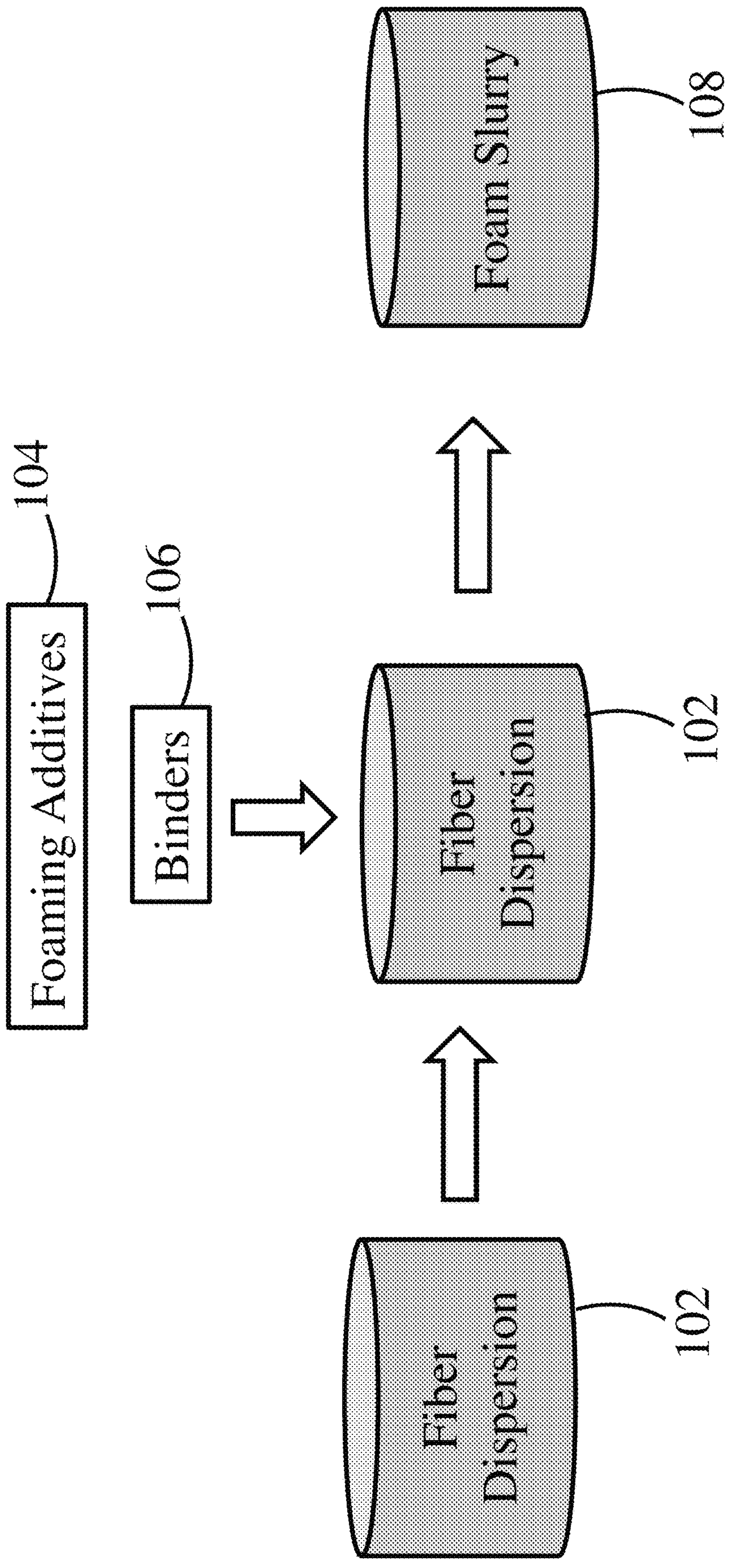
FIGS. 1A-1B show, according to some embodiments, schematic diagrams depicting a method of fabricating a filter media.

Filter media and related methods of fabricating the filter media are generally described herein. According to certain embodiments, the method of fabricating the filter media is a foam forming process that results in the filter media having improved properties as compared to a filter media that is essentially identical in composition (e.g., composition of fibers) but not fabricated according to the foam forming process. For example, in some embodiments, the filter media formed by the foam forming process has improved properties as compared to a filter media that is otherwise equivalent in composition but fabricated according to a conventional wetlaid process, or as compared to a filter media that is otherwise equivalent in composition but fabricated according to a process wherein dry fibers are added to a pre-formed foam or a pre-formed foam is added to dry fibers.

The foam forming method of fabricating the filter media comprises, in some embodiments, adding one or more foaming additives (e.g., one or more surfactants, air) to a fiber dispersion, thereby forming a foam slurry comprising the fiber dispersion. The foam slurry may have any of a variety of suitable liquid fractions and/or foam densities that provide the foam slurry with sufficient spacing between the fibers in the foam slurry, wherein the spacing between the fibers is occupied by a liquid and/or a gas (e.g., one or more bubbles) of the foam slurry. Without wishing to be bound by theory, the foam forming method therefore improves fiber uniformity and distribution during the fabrication process as compared to, for example, a conventional wetlaid process that does not use foaming additives. The foam slurry is applied to a carrier and dried, thereby providing a fiber web to be used in a filter media.

The foam forming process advantageously results in less energy consumption as compared to other filter media fabrication processes, such as a conventional wetlaid process. In some embodiments, for example, less water is consumed in the foam forming method as compared to a conventional wetlaid process, and the foam forming methods resultantly uses less heat in the drying process. The foam forming process is also advantageously fiber-agnostic, such that the method is compatible with many different types of fibers, including, for example, blends of fibers. In addition, the fiber web resulting from the foam forming method has an increased fiber mass as compared to a fiber web that is essentially identical in composition but not fabricated according to the foam forming process (e.g., a fiber web that is essentially identical in composition but fabricated according to a conventional wetlaid process), thereby using less fibers in the fabrication process.

The resulting filter media may have improved properties, such as an increased pore permeability index (PPI), specific dust holding capacity (DHC), air permeability, and/or pore size distribution, as compared to a filter media that is essentially identical in composition but not fabricated according to the foam forming process, for example a filter media that is essentially identical in composition but fabricated according to a conventional wetlaid process. The resulting filter media is a gas and/or liquid filtration and/or separation media that may be employed in any of a variety of suitable filtration and/or separation applications.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1B:
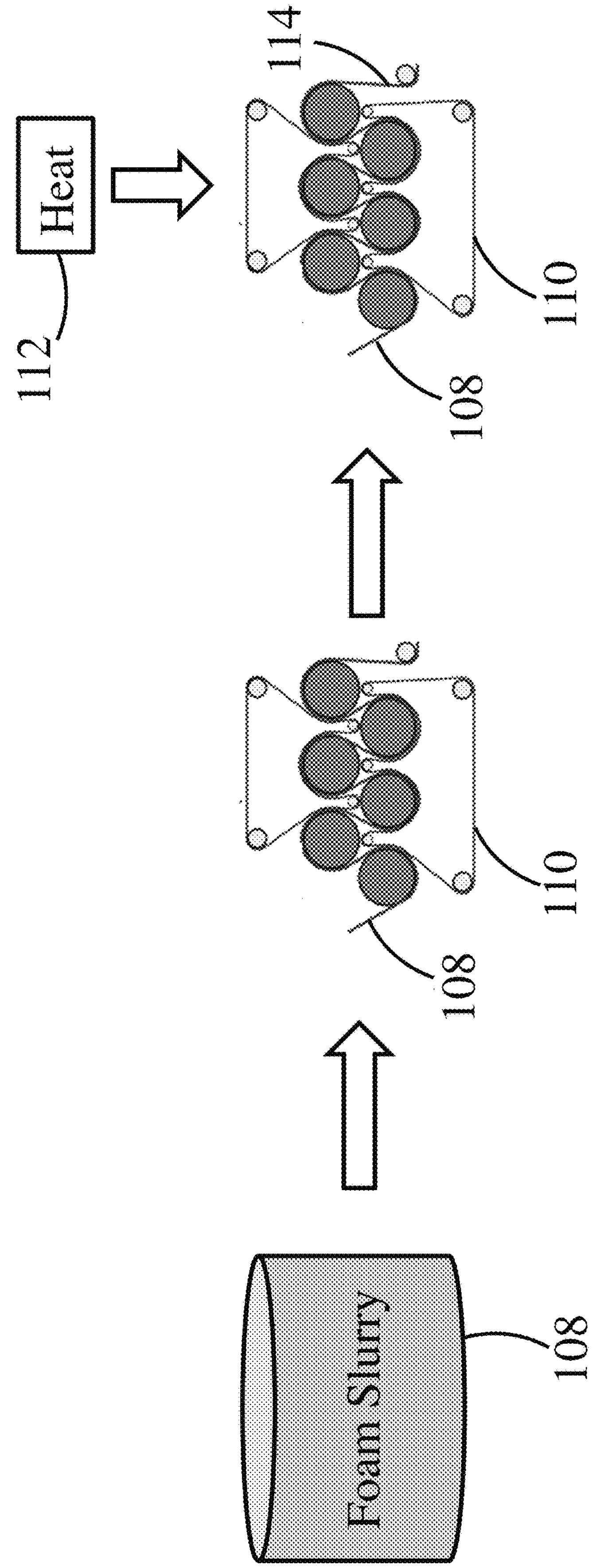

FIGS. 1A-1B shows, according to some embodiments, schematic diagrams depicting a method (e.g., a foam forming method) of fabricating a filter media. Referring to FIG. 1A, the method of fabricating the filter media comprises providing fiber dispersion 102. Fiber dispersion 102 comprises, in some embodiments, fibers dispersed in a liquid. In certain embodiments, the liquid comprises water.

Figure 2:
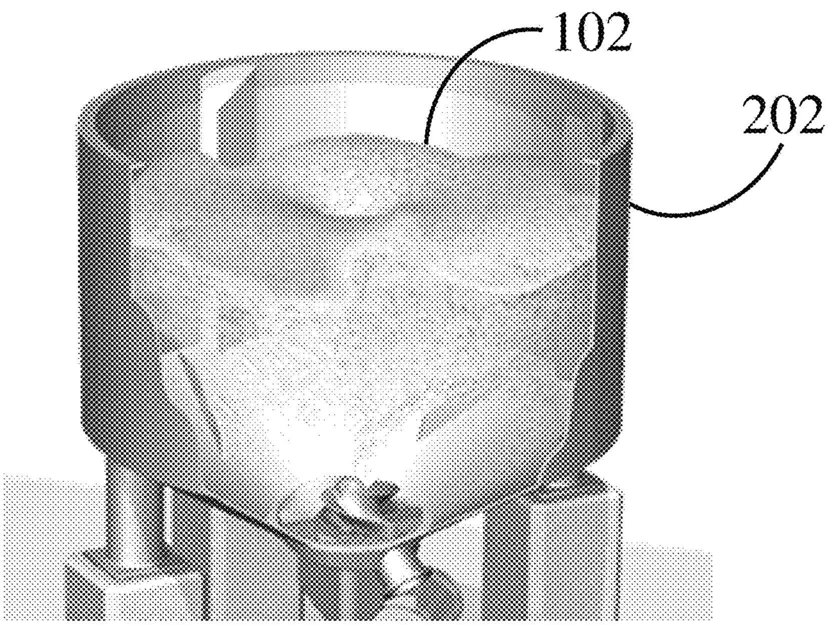
FIG. 2 shows, according to some embodiments, a schematic diagram of a fiber dispersion formed in a pulper.

In some embodiments, providing fiber dispersion 102 comprises forming fiber dispersion 102 in a pulper. FIG. 2 shows, according to some embodiments, a schematic diagram of fiber dispersion 102 formed in pulper 202.

The fiber dispersion may comprise any of a variety of suitable fibers. Advantageously, the foam forming method described herein is fiber-agnostic, such that the method is compatible with many different types of fibers, including, for example, blends of fibers. In some embodiments, for example, the fibers comprise cellulose fibers, nanocellulose fibers, microfibrillated cellulose fibrils, synthetic fibers, glass fibers, lyocell fibers, polyvinyl alcohol fibers, bicomponent fibers, tricomponent fibers, and/or combinations thereof. Suitable fiber dimensions (e.g., average fiber diameters, average fiber lengths, etc.) are explained in greater detail herein.

The fiber dispersion may comprise the fibers in any of a variety of suitable amounts. In some embodiments, for example, the fiber dispersion comprises the fibers in an amount greater than or equal to 0.1 weight % (wt. %), greater than or equal to 0.3 wt. %, greater than or equal to 0.5 wt. %, greater than or equal to 1 wt. %, greater than or equal to 5 wt. %, greater than or equal to 10 wt. %, or greater than or equal to 15 wt. % versus the total weight of the fiber dispersion. In certain embodiments, the fiber dispersion comprises the fibers in an amount less than or equal to 20 wt. %, less than or equal to 15 wt. %, less than or equal to 10 wt. %, less than or equal to 5 wt. %, less than or equal to 1 wt. %, less than or equal to 0.5 wt. %, or less than or equal to 0.1 wt. % versus the total weight of the fiber dispersion. Combinations of the above recited ranges are possible (e.g., the fiber dispersion comprises the fibers in an amount greater than or equal to 0.1 wt. % and less than or equal to 20 wt. % versus the total weight of the fiber dispersion, the fiber dispersion comprises the fibers in an amount greater than or equal to 0.3 wt. % and less than or equal to 15 wt. % versus the total weight of the fiber dispersion). Other ranges are also possible.

According to some embodiments, the foam forming method of fabricating the filter media comprises adding one or more foaming additives to the fiber dispersion. Referring to FIG. 1A, for example, the method comprises adding one or more foaming additives 104 to fiber dispersion 102. In some embodiments, adding the one or more foaming additives to the fiber dispersion provides a foam slurry wherein the fibers are evenly dispersed (e.g., evenly distributed) throughout the foam slurry, as explained in further detail herein. Without wishing to be bound by theory, the method described herein is advantageous over conventional methods of fabricating a filter media, including, for example, adding dry fibers to a pre-formed foam or adding a pre-formed foam to dry fibers, which may result in a foam slurry containing one or more agglomerations of fibers that are not evenly dispersed throughout the foam slurry.

In some embodiments, the one or more foaming additives comprise a surfactant. As would be understood by a person of ordinary skill in the art, the surfactant may advantageously decrease the surface tension of the liquid (e.g., water) of the fiber dispersion.

Any of a variety of suitable surfactants may be used. In some embodiments, for example, the surfactant comprises an amino-oxide, an ethoxylate, an alkyl-sulfate, an alkyl-ester, an ethanol-amine, an isotridecanolethoxylate, a polyester, a polyacrylate, a polysiloxane, an alkylphosphate, sodium-laurylsulfate, polyvinyl alcohol, stearylated ammonia, and/or combinations thereof. Other surfactants are also possible as the disclosure is not meant to be limiting in this regard.

In some embodiments, the one or more foaming additives comprise a gas. In certain embodiments, the gas comprises air (e.g., atmospheric air). The gas (e.g., air) may be used in combination with one or more surfactants, according to certain embodiments.

The fiber dispersion may comprise the one or more foaming additives in any of a variety of suitable amounts. In certain embodiments, for example, the fiber dispersion comprises the one or more foaming additives in an amount greater than or equal to 0.1 wt. %, greater than or equal to 0.2 wt. %, greater than or equal to 0.5 wt. %, greater than or equal to 1 wt. %, greater than or equal to 5 wt. %, greater than or equal to 10 wt. %, or greater than or equal to 15 wt. % versus the total weight of the fiber dispersion. In some embodiments, the fiber dispersion comprises the one or more foaming additives in an amount less than or equal to 20 wt. %, less than or equal to 15 wt. %, less than or equal to 10 wt. %, less than or equal to 5 wt. %, less than or equal to 1 wt. %, less than or equal to 0.5 wt. %, or less than or equal to 0.2 wt. % versus the total weight of the fiber dispersion. Combinations of the above recited ranges are possible (e.g., the fiber dispersion comprises the one or more foaming additives in an amount greater than or equal to 0.1 wt. % and less than or equal to 20 wt. % versus the total weight of the fiber dispersion, the fiber dispersion comprises the one or more foaming additives in an amount greater than or equal to 0.2 wt. % and less than or equal to 15 wt. % versus the total weight of the fiber dispersion). Other ranges are also possible.

In some embodiments, the one or more foaming additives may be added to the fiber dispersion in the pulper. In other embodiments, as explained in further detail below, the fiber dispersion may be transferred (e.g., flowed) from the pulper to a foam former prior to adding the one or more foaming additives to the fiber dispersion.

In certain embodiments, the foam forming method of fabricating the filter media comprises adding one or more binders to the fiber dispersion. Referring to FIG. 1A, for example, the method comprises adding one or more binders 106 to fiber dispersion 102.

Any of a variety of suitable binders may be used. In some embodiments, for example, the one or more binders comprise an acrylic binder, a phenolic binder, a melamine binder, an epoxy binder, a polyester binder, a particle binder, and/or combinations thereof. Other binders are also possible as the disclosure is not meant to be limiting in this regard.

The fiber dispersion may comprise the one or more binders in any of a variety of suitable amounts. In some embodiments, for example, the fiber dispersion comprises the one or more binders in an amount greater than or equal to 0.1 wt. %, greater than or equal to 0.2 wt. %, greater than or equal to 0.5 wt. %, greater than or equal to 1 wt. %, greater than or equal to 5 wt. %, greater than or equal to 10 wt. %, greater than or equal to 15 wt. %, greater than or equal to 20 wt. %, or greater than or equal to 25 wt. % versus the total weight of the fiber dispersion. In certain embodiments, the fiber dispersion comprises the one or more binders in an amount less than or equal to 30 wt. %, less than or equal to 25 wt. %, less than or equal to 20 wt. %, less than or equal to 15 wt. %, less than or equal to 10 wt. %, less than or equal to 5 wt. %, less than or equal to 1 wt. %, less than or equal to 0.5 wt. %, or less than or equal to 0.2 wt. % versus the total weight of the fiber dispersion. Combinations of the above recited ranges are possible (e.g., the fiber dispersion comprises the one or more binders in an amount greater than or equal to 0.1 wt. % and less than or equal to 30 wt. % versus the total weight of the fiber dispersion, the fiber dispersion comprises the one or more binders in an amount greater than or equal to 0.2 wt. % and less than or equal to 15 wt. % versus the total weight of the fiber dispersion). Other ranges are also possible.

In some embodiments, the one or more binders may be added to the fiber dispersion in the pulper. In other embodiments, as explained in further detail below, the fiber dispersion may be transferred (e.g., flowed) from the pulper to a foam former prior to adding the one or more binders to the fiber dispersion.

In some embodiments, the foam forming method of fabricating the filter media comprises forming a foam slurry comprising the fiber dispersion. The foam slurry may be formed, in some embodiments, as a result of adding the one or more foaming additives (e.g., one or more surfactants and/or air) to the fiber dispersion. Referring to FIG. 1A, for example, the method comprises forming foam slurry 108 as a result of adding one or more foaming additives 104 to fiber dispersion 102. As explained herein in greater detail, the foam slurry may advantageously comprise fibers evenly dispersed (e.g., evenly distributed) throughout the foam slurry as a result of adding the one or more foaming additives to the fiber dispersion.

In some embodiments, the foam slurry may be formed in a foam former. For example, in certain embodiments, the fiber dispersion may be transferred (e.g., flowed) from the pulper to the foam former prior to adding the one or more foaming additives to the fiber dispersion.

The foam former may comprise any of a variety of suitable fluidic connections. In certain embodiments, for example, the foam former comprises one or more fluidic connections that are configured to transfer (e.g., flow) the fiber dispersion from the pulper to the foam former. In some embodiments, the one or more fluidic connections configured to transfer the fiber dispersion from the pulper to the foam former may be configured to control a flow rate of the fiber dispersion. The foam former may, in some embodiments, comprise one or more fluidic connections that are configured to add the one or more foaming additives and/or the one or more binders to the fiber dispersion. In certain embodiments, the one or more fluidic connections configured to add the one or more foaming additives and/or the one or more binders to the fiber dispersion may be configured to control a flow rate of the one or more foaming additives and/or the one or more binders.

In some embodiments, the foam former may comprise one or more temperature regulators for regulating the temperature of the foam slurry in the foam former.

The foam slurry may be formed at any of a variety of suitable temperatures. In certain embodiments, for example, the foam slurry is formed at a temperature of greater than 0° C., greater than or equal to 20° C., greater than or equal to 40° C., or greater than or equal to 60° C. In some embodiments, the foam slurry is formed at a temperature of less than or equal to 80° C., less than or equal to 60° C., less than or equal to 40° C., or less than or equal to 20° C. Combinations of the above recited ranges are possible (e.g., the foam slurry is formed at a temperature of greater than 0° C. and less than or equal to 80° C., the foam slurry is formed at a temperature of greater than or equal to 20° C. and less than or equal to 60° C.). Other ranges are also possible.

In certain embodiments, the foam former may comprise one or more pressure regulators for regulating the pressure of the foam slurry in the foam former.

The foam slurry may have any of a variety of suitable liquid fractions. As used herein, the liquid fraction of the foam slurry is the volume of liquid per unit volume of a sample of the foam slurry. In some embodiments, the liquid fraction advantageously provides a foam slurry with sufficient spacing between the fibers, wherein the spacing between the fibers is occupied by the liquid and/or gas (e.g., one or more bubbles) of the foam slurry. Without wishing to be bound by theory, a foam slurry having a liquid fraction as described herein during the fabrication process results in a filter media having improved properties as compared to a filter media that is essentially identical in composition but not fabricated according to the foam forming method (e.g., a filter media that is essentially identical in composition but fabricated according to a conventional wetlaid process).

In some embodiments, the foam slurry has a liquid fraction of greater than or equal to 2%, greater than or equal to 5%, greater than or equal to 10%, greater than or equal to 20%, greater than or equal to 30%, greater than or equal to 40%, greater than or equal to 50%, greater than or equal to 60%, greater than or equal to 70%, or greater than or equal to 80%. In certain embodiments, the foam slurry has a liquid fraction of less than or equal to 90%, less than or equal to 80%, less than or equal to 70%, less than or equal to 60%, less than or equal to 50%, less than or equal to 40%, less than or equal to 30%, less than or equal to 20%, less than or equal to 10%, or less than or equal to 5%. Combinations of the above recited ranges are possible (e.g., the foam slurry has a liquid fraction of greater than or equal to 2% and less than or equal to 90%, the foam slurry has a liquid fraction of greater than or equal to 5% and less than or equal to 60%). Other ranges are also possible.

In some embodiments, the liquid fraction of the foam slurry may be determined by: (i) using an optical sensor and prism to create a two-dimensional cut through the foam slurry; and (ii) using software associated with the optical sensor to calculate the number of bubbles per unit area of the foam slurry, the size of the bubbles, and the statistical distribution of the bubbles. In certain embodiments, the liquid fraction of the foam slurry is determined, for example, using a DFA100 Krüss Dynamic Foam Analyzer.

The foam slurry may have any of a variety of suitable foam densities. As used herein, the foam density of the foam slurry is the weight of a sample of the foam slurry per unit volume of the sample of the foam slurry. In some embodiments, the foam density advantageously provides a foam slurry with sufficient spacing between the fibers, wherein the spacing between the fibers is occupied by the liquid and/or gas (e.g., one or more bubbles) of the foam slurry. Without wishing to be bound by theory, a foam slurry having a foam density as described herein during the fabrication process results in filter media having improved properties as compared to a filter media that is essentially identical in composition but not fabricated according to the foam forming method (e.g., a filter media that is essentially identical in composition but fabricated according to a conventional wetlaid process).

In some embodiments, the foam slurry has a foam density of greater than or equal to 20 g/l, greater than or equal to 30 g/l, greater than or equal to 50 g/l, greater than or equal to 100 g/l, greater than or equal to 200 g/l, greater than or equal to 300 g/l, greater than or equal to 400 g/l, greater than or equal to 500 g/l, greater than or equal to 600 g/l, or greater than or equal to 700 g/l. In certain embodiments, the foam slurry has a foam density of less than or equal to 800 g/l, less than or equal to 700 g/l, less than or equal to 600 g/l, less than or equal to 500 g/l, less than or equal to 400 g/l, less than or equal to 300 g/l, less than or equal to 200 g/l, less than or equal to 100 g/l, less than or equal to 50 g/l, or less than or equal to 30 g/l. Combinations of the above recited ranges are possible (e.g., the foam slurry has a foam density of greater than or equal to 20 g/l and less than or equal to 800 g/l, the foam slurry has a foam density of greater than or equal to 30 g/l and less than or equal to 600 g/l). Other ranges are also possible.

The foam density of the foam slurry may be determined, in some embodiments, by calculating the weight of a sample of the foam slurry divided by the volume of the sample. In some embodiments, the foam density of the foam slurry may be determined by: (i) using an optical sensor and prism to create a two-dimensional cut through the foam slurry; and (ii) using software associated with the optical sensor to calculate the number of bubbles per unit area of the foam slurry, the size of the bubbles, and the statistical distribution of the bubbles. In certain embodiments, the foam density of the foam slurry is determined, for example, using a DFA100 Krüss Dynamic Foam Analyzer.

According to some embodiments, the foam forming method of fabricating the filter media comprises applying the foam slurry onto a carrier. Referring to FIG. 1B, for example, the method comprises applying foam slurry 108 onto carrier 110. In certain embodiments, carrier 110 is a semi-continuous or a continuous moving carrier. According to certain embodiments, carrier 110 is planar. In some embodiments, for example, foam slurry 108 is applied onto planar carrier 110 such that foam slurry 108 has a two-dimensional, planar configuration. According to certain embodiments, the fibers advantageously remain evenly dispersed (e.g., evenly distributed) throughout the foam slurry as the foam slurry is applied onto the carrier.

Any of a variety of suitable carriers may be employed. In some embodiments, for example, carrier 110 may be a wire. Other examples of carriers are also possible, however, as the disclosure is not meant to be limiting in this regard.

In some embodiments, applying the foam slurry onto the carrier (e.g., the semi-continuous or the continuous moving carrier) comprises flowing the foam slurry through an applicator and onto the carrier. The applicator may be configured, in some embodiments, to spread the foam slurry evenly onto the carrier (e.g., wire).

Any of a variety of suitable applicators may be employed, such as a headbox, a foam nozzle, a curtain coater, and/or a slot die. Other applicators are also possible as the disclosure is not meant to be limiting in this regard.

In certain embodiments, the foam forming method of fabricating the filter media comprises drying the foam slurry. Referring to FIG. 1B, for example, the method comprises applying heat 112 to foam slurry 108. In some embodiments, heat 112 may be applied to foam slurry 108 as foam slurry 108 travels along carrier 110. For example, in some embodiments, applying heat 112 to foam slurry 108 as foam slurry 108 travels along carrier 110 comprises a contact drying process such that foam slurry 108 is in contact with a heated surface. In some such embodiments, carrier 110 may be the heated surface. According to some embodiments, applying heat 112 to foam slurry 108 evaporates liquid (e.g., water) as foam slurry 108 travels along carrier 110. Liquid (e.g., water) may be drained from the foam slurry with or without the application of heat, in certain embodiments.

The foam slurry may be dried using any of a variety of suitable heat sources. In some embodiments, for example, the foam slurry may be dried using one or more heated drying cans and/or cylinders, air dryers and/or ovens (e.g., through air dryers and/or ovens), belt dryers, and/or infrared (IR) heaters.

The foam slurry may be dried at any of a variety of suitable temperatures. In some embodiments, for example, the foam slurry is dried at a temperature of greater than or equal to 40° C., greater than or equal to 60° C., or greater than or equal to 80° C. In certain embodiments, the foam slurry is dried at a temperature of less than or equal to 100° C., less than or equal to 80° C., or less than or equal to 60° C. Combinations of the above recited ranges are possible (e.g., the foam slurry is dried at a temperature of greater than or equal to 40° C. and less than or equal to 100° C., the foam slurry is dried at a temperature of greater than or equal to 60° C. and less than or equal to 80° C.). Other ranges are also possible.

According to some embodiments, fiber web 114 may be provided as a result of drying foam slurry 108. In certain embodiments, fiber web 114 advantageously comprises a uniform fiber matrix as a result of the fibers being evenly dispersed (e.g., evenly distributed) in foam slurry 108 during the drying process. As explained in further detail herein, the resulting fiber web (and/or a filter media comprising the fiber web) may have improved properties as compared to a fiber web that is essentially identical in composition but not fabricated according to the foam forming method described herein (e.g., a fiber web that is essentially identical in composition but fabricated according to a conventional wetlaid process). The fiber web may, in certain embodiments, be a non-woven fiber web. In some embodiments, the fiber web comprises a plurality of pores passing through the fiber web from a first surface of the fiber web to a second surface of the fiber web that is directly opposite the first surface.

In certain embodiments, the fiber web comprises a plurality of fibers. As explained in further detail herein, the foam forming method is advantageously fiber-agnostic, such that the resulting filter media may comprise any of a variety of suitable fibers depending on the application, including, for example, blends of fibers. The fiber web may comprise, in some embodiments, any of the aforementioned fibers with respect to the fiber dispersion (e.g., the fiber web comprises cellulose fibers, nanocellulose fibers, microfibrillated cellulose fibrils, synthetic fibers, glass fibers, lyocell fibers, polyvinyl alcohol fibers, bicomponent fibers, tricomponent fibers, and/or combinations thereof).

As explained herein, the fibers may have any of a variety of suitable dimensions. In certain embodiments, for example, the fibers have any of a variety of suitable average fiber diameters. In some embodiments, the fibers have an average fiber diameter of greater than or equal to 5 nm, greater than or equal to 50 nm, greater than or equal to 0.1 micrometers, greater than or equal to 0.5 micrometers, greater than or equal to 1 micrometer, greater than or equal to 5 micrometers, greater than or equal to 10 micrometers, greater than or equal to 20 micrometers, greater than or equal to 30 micrometers, or greater than or equal to 40 micrometers. In certain embodiments, the fibers have an average fiber diameter of less than or equal to 50 micrometers, less than or equal to 40 micrometers, less than or equal to 30 micrometers, less than or equal to 20 micrometers, less than or equal to 10 micrometers, less than or equal to 5 micrometers, less than or equal to 1 micrometer, less than or equal to 0.5 micrometers, less than or equal to 0.1 micrometers, or less than or equal to 50 nm. Combinations of the above recited range are possible (e.g., the fibers have an average fiber diameter of greater than or equal to 5 nm and less than or equal to 50 micrometers, the fibers have an average fiber diameter of greater than or equal to 1 micrometer and less than or equal to 5 micrometers). Other ranges are also possible.

In embodiments in which the fiber web comprises cellulose fibers, the cellulose fibers may have any of a variety of suitable average fiber diameters. In certain embodiments, for example, the cellulose fibers have an average fiber diameter of greater than or equal to 10 micrometers, greater than or equal to 20 micrometers, greater than or equal to 30 micrometers, or greater than or equal to 40 micrometers. In some embodiments, the cellulose fibers have an average fiber diameter of less than or equal to 50 micrometers, less than or equal to 40 micrometers, less than or equal to 30 micrometers, or less than or equal to 20 micrometers. Combinations of the above recited ranges are possible (e.g., the cellulose fibers have an average fiber diameter of greater than or equal to 10 micrometers and less than or equal to 50 micrometers, the cellulose fibers have an average fiber diameter of greater than or equal to 20 micrometers and less than or equal to 40 micrometers). Other ranges are also possible.

In embodiments in which the fiber web comprises microfibrillated cellulose fibrils, the microfibrillated cellulose fibrils may have any of a variety of suitable average fibril diameters. In certain embodiments, for example, the microfibrillated cellulose fibrils have an average fibril diameter of greater than or equal to 5 nanometers, greater than or equal to 10 nanometers, greater than or equal to 50 nanometers, greater than or equal to 100 nanometers, greater than or equal to 200 nanometers, or greater than or equal to 300 nanometers. In some embodiments, the microfibrillated cellulose fibrils have an average fibril diameter of less than or equal to 400 nanometers, less than or equal to 300 nanometers, less than or equal to 200 nanometers, less than or equal to 100 nanometers, less than or equal to 50 nanometers, or less than or equal to 10 nanometers. Combinations of the above recited ranges are possible (e.g., the microfibrillated cellulose fibrils have an average fibril diameter of greater than or equal to 5 nanometers and less than or equal to 400 nanometers, the microfibrillated cellulose fibrils have an average fibril diameter of greater than or equal to 10 nanometers and less than or equal to 300 nanometers). Other ranges are also possible.

In embodiments in which the fiber web comprises synthetic fibers, the synthetic fibers may have any of a variety of suitable average fiber diameters. In some embodiments, for example, the synthetic fibers have an average fiber diameter of greater than or equal to 3 micrometers, greater than or equal to 4 micrometers, greater than or equal to 5 micrometers, greater than or equal to 10 micrometers, greater than or equal to 15 micrometers, or greater than or equal to 20 micrometers. In certain embodiments, the synthetic fibers have an average fiber diameter of less than or equal to 25 micrometers, less than or equal to 20 micrometers, less than or equal to 15 micrometers, less than or equal to 10 micrometers, less than or equal to 5 micrometers, or less than or equal to 4 micrometers. Combinations of the above recited ranges are possible (e.g., the synthetic fibers have an average fiber diameter of greater than or equal to 3 micrometers and less than or equal to 25 micrometers, the synthetic fibers have an average fiber diameter of greater than or equal to 4 micrometers and less than or equal to 20 micrometers). Other ranges are also possible.

In embodiments in which the fiber web comprises glass fibers, the glass fibers may have any of a variety of suitable average fiber diameters. In some embodiments, for example, the glass fibers have an average fiber diameter of greater than or equal to 0.2 micrometers, greater than or equal to 0.4 micrometers, greater than or equal to 0.6 micrometers, or greater than or equal to 0.8 micrometers. In certain embodiments, the glass fibers have an average fiber diameter of less than or equal to 1 micrometer, less than or equal to 0.8 micrometers, less than or equal to 0.6 micrometers, or less than or equal to 0.4 micrometers. Combinations of the above recited ranges are possible (e.g., the glass fibers have an average fiber diameter of greater than or equal to 0.2 micrometers and less than or equal to 1 micrometer, the glass fibers may have an average fiber diameter of greater than or equal to 0.4 micrometers and less than or equal to 0.8 micrometers). Other ranges are also possible.

In embodiments in which the fiber web comprises lyocell fibers, the lyocell fibers may have any of a variety of suitable average fiber diameters. In certain embodiments, for example, the lyocell fibers have an average fiber diameter of greater than or equal to 0.1 micrometers, greater than or equal to 1 micrometer, greater than or equal to 5 micrometers, greater than or equal to 10 micrometers, or greater than or equal to 15 micrometers. In some embodiments, the lyocell fibers have an average fiber diameter of less than or equal to 20 micrometers, less than or equal to 15 micrometers, less than or equal to 10 micrometers, less than or equal to 5 micrometers, or less than or equal to 1 micrometer. Combinations of the above recited ranges are possible (e.g., the lyocell fibers have an average fiber diameter of greater than or equal to 0.1 micrometers and less than or equal to 20 micrometers, the lyocell fibers have an average fiber diameter of greater than or equal to 1 micrometer and less than or equal to 15 micrometers). Other ranges are also possible.

The fibers may have any of a variety of suitable average fiber lengths. In some embodiments, for example, the fibers have an average fiber length of greater than or equal to 1.5 nm, greater than or equal to 50 nm, greater than or equal to 100 nm, greater than or equal to 1 micrometer, greater than or equal to 10 micrometers, greater than or equal to 100 micrometers, greater than or equal to 1 millimeter, greater than or equal to 5 millimeters, or greater than or equal to 10 millimeters. In certain embodiments, the fibers have an average fiber length of less than or equal to 20 millimeters, less than or equal to 10 millimeters, less than or equal to 5 millimeters, less than or equal to 1 millimeter, less than or equal to 100 micrometers, less than or equal to 10 micrometers, less than or equal to 1 micrometer, less than or equal to 100 nm, or less than or equal to 50 nm. Combinations of the above recited ranges are possible (e.g., the fibers have an average fiber length of greater than or equal to 1.5 nm and less than or equal to 20 millimeters, the fibers have an average fiber length of greater than or equal to 10 micrometers and less than or equal to 100 micrometers). Other ranges are also possible.

In embodiments in which the fiber web comprises cellulose fibers, the cellulose fibers may have any of a variety of suitable average fiber lengths. In some embodiments, for example, the cellulose fibers have an average fiber length of greater than or equal to 1 millimeter, greater than or equal to 2 millimeters, greater than or equal to 4 millimeters, or greater than or equal to 6 millimeters. In certain embodiments, the cellulose fibers have an average fiber length of less than or equal to 8 millimeters, less than or equal to 6 millimeters, less than or equal to 4 millimeters, or less than or equal to 2 millimeters. Combinations of the above recited ranges are possible (e.g., the cellulose fibers have an average fiber length of greater than or equal to 1 millimeter and less than or equal to 8 millimeters, the cellulose fibers have an average fiber length of greater than or equal to 2 millimeters and less than or equal to 6 millimeters). Other ranges are also possible.

In embodiments in which the fiber web comprises microfibrillated cellulose fibrils, the microfibrillated cellulose fibrils may have any of a variety of suitable average fibril lengths. In some embodiments, for example, the microfibrillated cellulose fibrils have an average fibril length of greater than or equal to 1 nanometer, greater than or equal to 1.5 nanometers, greater than or equal to 5 nanometers, greater than or equal to 10 nanometers, or greater than or equal to 20 nanometers. In certain embodiments, the microfibrillated cellulose fibrils have an average fibril length of less than or equal to 30 nanometers, less than or equal to 20 nanometers, less than or equal to 10 nanometers, less than or equal to 5 nanometers, or less than or equal to 1.5 nanometers. Combinations of the above recited ranges are possible (e.g., the microfibrillated cellulose fibrils have an average fibril length of greater than or equal to 1 nanometer and less than or equal to 30 nanometers, the microfibrillated cellulose fibrils have an average fibril length of greater than or equal to 1.5 nanometers and less than or equal to 20 nanometers). Other ranges are also possible.

In embodiments in which the fiber web comprises synthetic fibers, the synthetic fibers may have any of a variety of suitable average fiber lengths. In certain embodiments, for example, the synthetic fibers have an average fiber length of greater than or equal to 2 millimeters, greater than or equal to 5 millimeters, greater than or equal to 10 millimeters, or greater than or equal to 15 millimeters. In some embodiments, the synthetic fibers have an average fiber length of less than or equal to 20 millimeters, less than or equal to 15 millimeters, less than or equal to 10 millimeters, or less than or equal to 5 millimeters. Combinations of the above recited ranges are possible (e.g., the synthetic fibers have an average fiber length of greater than or equal to 2 millimeters and less than or equal to 20 millimeters, the synthetic fibers have an average fiber length of greater than or equal to 5 millimeters and less than or equal to 15 millimeters). Other ranges are also possible.

In embodiments in which the fiber web comprises glass fibers, the glass fibers may have any of a variety of suitable average fiber lengths. In certain embodiments, for example, the glass fibers have an average fiber length of greater than or equal to 0.5 millimeters, greater than or equal to 1 millimeter, or greater than or equal to 2 millimeters. In some embodiments, the glass fibers have an average fiber length of less than or equal to 3 millimeters, less than or equal to 2 millimeters, or less than or equal to 1 millimeter. Combinations of the above recited ranges are possible (e.g., the glass fibers have an average fiber length of greater than or equal to 0.5 millimeters and less than or equal to 3 millimeters, the glass fibers have an average fiber length of greater than or equal to 1 millimeter and less than or equal to 2 millimeters). Other ranges are also possible.

In embodiments in which the fiber web comprises lyocell fibers, the lyocell fibers may have any of a variety of suitable average fiber lengths. In some embodiments, for example, the lyocell fibers may have an average fiber length of greater than or equal to 1 millimeter, greater than or equal to 1.5 millimeters, greater than or equal to 2 millimeters, greater than or equal to 3 millimeters, greater than or equal to 4 millimeters, or greater than or equal to 5 millimeters. In certain embodiments, the lyocell fibers have an average fiber length of less than or equal to 6 millimeters, less than or equal to 5 millimeters, less than or equal to 4 millimeters, less than or equal to 3 millimeters, less than or equal to 2 millimeters, or less than or equal to 1.5 millimeters. Combinations of the above recited ranges are possible (e.g., the lyocell fibers have an average fiber length of greater than or equal to 1 millimeter and less than or equal to 6 millimeters, the lyocell fibers have an average fiber length of greater than or equal to 1.5 millimeters and less than or equal to 5 millimeters). Other ranges are also possible.

The fibers may have any of a variety of suitable average Canadian Standard Freeness (CSF) values. As would be understood by a person of ordinary skill in the art, the CSF is a measurement of the rate at which a dilute suspension of fibers (e.g., a pulp) may be drained. The average CSF of the fibers can be measured according to a CSF test, specified by TAPPI test method T-227-om-09 Freeness of pulp (2009). The test can provide an average level of fibrillation (i.e., an average Canadian Standard Freeness value). This average level of fibrillation is a characteristic of the plurality of fibers being measured. In other words, a plurality of fibers having a certain average level of fibrillation may comprise some fibers that have a higher degree of fibrillation than that average and some fibers that have a lower degree of fibrillation than that average. It is also possible for a plurality of fibers to comprise, consist essentially of, and/or consist of, fibers having a level of fibrillation that is identical to the average level of fibrillation for the plurality.

In certain embodiments, the fibers have an average CSF of greater than or equal to 100 CSF, greater than or equal to 150 CSF, greater than or equal to 200 CSF, greater than or equal to 300 CSF, greater than or equal to 400 CSF, greater than or equal to 500 CSF, greater than or equal to 600 CSF, greater than or equal to 700 CSF, or greater than or equal to 800 CSF. In some embodiments, the fibers have an average CSF of less than or equal to 850 CSF, less than or equal to 800 CSF, less than or equal to 700 CSF, less than or equal to 600 CSF, less than or equal to 500 CSF, less than or equal to 400 CSF, less than or equal to 300 CSF, less than or equal to 200 CSF, or less than or equal to 150 CSF. Combinations of the above recited ranges are possible (e.g., the fibers have an average CSF of greater than or equal to 100 CSF and less than or equal to 850 CSF, the fibers have an average CSF of greater than or equal to 150 CSF and less than or equal to 600 CSF). Other ranges are also possible.

In embodiments in which the fiber web comprises lyocell fibers, the lyocell fibers may have any of a variety of suitable average CSF values. In certain embodiments, for example, the lyocell fibers have an average CSF of greater than or equal to 100 CSF, greater than or equal to 150 CSF, greater than or equal to 200 CSF, greater than or equal to 300 CSF, greater than or equal to 400 CSF, greater than or equal to 500 CSF, greater than or equal to 600 CSF, greater than or equal to 700 CSF, or greater than or equal to 800 CSF. In some embodiments, the lyocell fibers have an average CSF of less than or equal to 850 CSF, less than or equal to 800 CSF, less than or equal to 700 CSF, less than or equal to 600 CSF, less than or equal to 500 CSF, less than or equal to 400 CSF, less than or equal to 300 CSF, less than or equal to 200 CSF, or less than or equal to 150 CSF. Combinations of the above recited ranges are possible (e.g., the lyocell fibers have an average CSF of greater than or equal to 100 CSF and less than or equal to 850 CSF, the lyocell fibers have an average CSF of greater than or equal to 150 CSF and less than or equal to 600 CSF). Other ranges are also possible.

The fiber web may comprise the fibers in any of a variety of suitable amounts. In some embodiments, for example, the fiber web comprises the fibers in an amount greater than or equal to 0.1 wt. %, greater than or equal to 0.2 wt. %, greater than or equal to 0.5 wt. %, greater than or equal to 1 wt. %, greater than or equal to 5 wt. %, greater than or equal to 10 wt. %, greater than or equal to 20 wt. %, greater than or equal to 30 wt. %, greater than or equal to 40 wt. %, greater than or equal to 50 wt. %, greater than or equal to 60 wt. %, greater than or equal to 70 wt. %, greater than or equal to 80 wt. %, greater than or equal to 90 wt. %, or greater than or equal to 99 wt. % versus the total weight of the fiber web. In certain embodiments, the fiber web comprises the fibers in an amount less than or equal to 99.9 wt. %, less than or equal to 99 wt. %, less than or equal to 90 wt. %, less than or equal to 80 wt. %, less than or equal to 70 wt. %, less than or equal to 60 wt. %, less than or equal to 50 wt. %, less than or equal to 40 wt. %, less than or equal to 30 wt. %, less than or equal to 20 wt. %, less than or equal to 10 wt. %, less than or equal to 5 wt. %, less than or equal to 1 wt. %, less than or equal to 0.5 wt. %, or less than or equal to 0.2 wt. % versus the total weight of the fiber web. Combinations of the above recited ranges are possible (e.g., the fiber web comprises the fibers in an amount greater than or equal to 0.1 wt. % and less than or equal to 99.9 wt. % versus the total weight of the fiber web, the fiber web comprises the fibers in an amount greater than or equal to 0.2 wt. % and less than or equal to 99.5 wt. % versus the total weight of the fiber web). Other ranges are also possible.

According to some embodiments, the fiber web comprises one or more binders. The fiber web may comprise, in certain embodiments, any of the aforementioned binders with respect to the fiber dispersion (e.g., the fiber web comprises one or more acrylic binders, phenolic binders, melamine binders, epoxy binders, polyester binders, particle binders, and/or combinations thereof).

The fiber web may comprise the one or more binders in any of a variety of suitable amounts. In some embodiments, for example, the fiber web comprises the one or more binders in an amount greater than or equal to 0.1 wt. %, greater than or equal to 0.2 wt. %, greater than or equal to 0.5 wt. %, greater than or equal to 1 wt. %, greater than or equal to 5 wt. %, greater than or equal to 10 wt. %, greater than or equal to 15 wt. %, greater than or equal to 20 wt. %, or greater than or equal to 25 wt. % versus the total weight of the fiber web. In certain embodiments, the fiber web comprises the one or more binders in an amount less than or equal to 30 wt. %, less than or equal to 25 wt. %, less than or equal to 20 wt. %, less than or equal to 15 wt. %, less than or equal to 10 wt. %, less than or equal to 1 wt. %, less than or equal to 0.5 wt. %, or less than or equal to 0.2 wt. % versus the total weight of the fiber web. Combinations of the above recited ranges are possible (e.g., the fiber web comprises the one or more binders in an amount greater than or equal to 0.1 wt. % and less than or equal to 30 wt. % versus the total weight of the fiber web, the fiber web comprises the one or more binders in an amount greater than or equal to 0.2 wt. % and less than or equal to 15 wt. % versus the total weight of the fiber web). Other ranges are also possible.

The fiber web may have any of a variety of suitable thicknesses. According to certain embodiments, the foam forming method may result in a fiber web with an increased fiber mass as compared to a fiber web that is essentially identical in composition but not fabricated according to the foam forming method (e.g., a fiber web that is essentially identical in composition but fabricated according to a conventional wetlaid process). The increased fiber mass may, in some embodiments, result in a filter media with improved properties (e.g., specific DHC) as compared to a filter media that is essentially identical in composition but not fabricated according to the foam forming method, without affording losses in fiber web thickness.

In some embodiments, the fiber web has a thickness of greater than or equal to 0.1 mm, greater than or equal to 0.15 mm, greater than or equal to 0.5 mm, greater than or equal to 1 mm, greater than or equal to 1.5 mm, greater than or equal to 2 mm, or greater than or equal to 2.5 mm. In certain embodiments, the fiber web has a thickness of less than or equal to 3 mm, less than or equal to 2.5 mm, less than or equal to 2 mm, less than or equal to 1.5 mm, less than or equal to 1 mm, less than or equal to 0.5 mm, or less than or equal to 0.15 mm. Combinations of the above recited ranges are possible (e.g., the fiber web has a thickness of greater than or equal to 0.1 mm and less than or equal to 3 mm, the fiber web has a thickness of greater than or equal to 0.15 mm and less than or equal to 2.5 mm). Other ranges are also possible.

The thickness of the fiber web may be determined in accordance with ISO 534 (2011) at 2 $N/cm^2$.

According to certain embodiments, the fiber web may be fabricated into a filter media comprising the fiber web.

The filter media may have any of a variety of suitable pore permeability indexes. In some embodiments, for example, the filter media has a PPI of greater than or equal to 0.2, greater than or equal to 0.3, greater than or equal to 0.5, greater than or equal to 1, greater than or equal to 1.5, greater than or equal to 2, greater than or equal to 2.5, greater than or equal to 3, or greater than or equal to 3.5. In certain embodiments, the filter media has a PPI of less than or equal to 4, less than or equal to 3.5, less than or equal to 3, less than or equal to 2.5, less than or equal to 2, less than or equal to 1.5, less than or equal to 1, less than or equal to 0.5, or less than or equal to 0.3. Combinations of the above recited ranges are possible (e.g., the filter media has a PPI of greater than or equal to 0.2 and less than or equal to 4.0, the filter media has a PPI of greater than or equal to 0.3 and less than or equal to 3.5). Other ranges are also possible.

The PPI of the filter media may be determined according to the following equation:

$$PPI = \frac{\text{mean flow pore size}}{\sqrt{\text{air permeability}}}$$

The mean flow pore size of the filter media and the air permeability of the filter media are explained herein in greater detail.

The filter media may have any of a variety of suitable pore size distributions. As used herein, the pore size distribution refers to the percent of pores of the filter media having an average pore size less than 5 micrometers (e.g., less than or equal to 4 micrometers, less than or equal to 3 micrometers, less than or equal to 2 micrometers, less than or equal to 1 micrometer, etc.).

In some embodiments, greater than or equal to 5%, greater than or equal to 10%, greater than or equal to 15%, greater than or equal to 20%, greater than or equal to 25%, greater than or equal to 30%, greater than or equal to 35%, greater than or equal to 40%, or greater than or equal to 45% of pores of the plurality of pores have an average size of less than or equal to 5 micrometers (e.g., less than or equal to 4 micrometers, less than or equal to 3 micrometers, less than or equal to 2 micrometers, less than or equal to 1 micrometer, etc.). In certain embodiments, less than or equal to 50%, less than or equal to 45%, less than or equal to 40%, less than or equal to 35%, less than or equal to 30%, less than or equal to 25%, less than or equal to 20%, less than or equal to 15%, or less than or equal to 10% of the pores of the plurality of pores have an average size of less than or equal to 5 micrometers (e.g., less than or equal to 4 micrometers, less than or equal to 3 micrometers, less than or equal to 2 micrometers, less than or equal to 1 micrometer, etc.). Combinations of the above recited ranges are possible (e.g., greater than or equal to 5% and less than or equal to 50% of the pores of the plurality of pores have an average size of less than or equal to 5 micrometers, greater than or equal to 10% and less than or equal to 45% of the pores of the plurality of pores have an average size of less than or equal to 5 micrometers). Other ranges are also possible.

The pore size distribution of the filter media may be determined by capillary flow porometry. The measurement may be performed by wetting the filter media with a liquid to fill at least all through pores, applying a gas (e.g., air or nitrogen) of increasing pressure to one side of the filter media, and expelling the liquid from each through pore according to its size (diameter, d) at a defining pressure according to the Washburn equation, $Pd=4\gamma\cos\theta$, wherein $\gamma$ is the surface tension of the liquid and $\theta$ is the contact angle between the liquid and the filter media. The resulting flow of gas through empty pores is measured to calculate the largest pore size from the bubble point. A second data set of flow versus pressure through the completely dry sample is used in combination with the wet flow data to calculate mean flow pore size and a pore size distribution of all through pores within the range of the measurement system. The largest pore (lower boundary of the pore size distribution) is determined by the flow at which the wet flow data linearizes (i.e., substantially equal to the dry flow rate). The pore size distribution may be represented as cumulative flow (percentage of total or volume per unit time) or differential flow.

The filter media may have of a variety of suitable pore size distribution improvements as compared to a filter media that is essentially identical in composition but not fabricated according to the foam forming method (e.g., a filter media that is essentially identical in composition but fabricated according to a conventional wetlaid process). As used herein, the pore size distribution improvement refers to the percent increase in the percentage of pores having an average size of less than or equal to 5 micrometers (e.g., less than or equal to 4 micrometers, less than or equal to 3 micrometers, less than or equal to 2 micrometers, less than or equal to 1 micrometer, etc.) as compared to a filter media that is essentially identical in composition but not fabricated according to the foam forming method (e.g., a filter media that is essentially identical in composition but fabricated according to a conventional wetlaid process).

In some embodiments, the filter media has a pore size distribution improvement of greater than or equal to 5%, greater than or equal to 10%, greater than or equal to 50%, greater than or equal to 100%, greater than or equal to 150%, greater than or equal to 200%, greater than or equal to 250%, greater than or equal to 300%, greater than or equal to 350%, greater than or equal to 400%, or greater than or equal to 450% as compared to a filter media that is essentially identical in composition but not fabricated according to the foam forming method. In certain embodiments, the filter media has a pore size distribution improvement of less than or equal to 500%, less than or equal to 450%, less than or equal to 400%, less than or equal to 350%, less than or equal to 300%, less than or equal to 250%, less than or equal to 200%, less than or equal to 150%, less than or equal to 100%, less than or equal to 50%, or less than or equal to 10% as a compared to a filter media that is essentially identical in composition but not fabricated according to the foam forming method. Combinations of the above recited ranges are possible (e.g., the filter media has a pore size distribution improvement of greater than or equal to 5% and less than or equal to 500% as compared to a filter media that is essentially identical in composition but not fabricated according to the foam forming method, the filter media has a pore size distribution improvement of greater than or equal to 10% and less than or equal to 250% as compared to a filter media that is essentially identical in composition but not fabricated according to the foam forming method). Other ranges are also possible.

The pore size distribution improvement of the filter media as compared to a filter media that is essentially identical in composition but not fabricated according to the foam forming method may be determined by calculating the percent difference in the pore size distribution between the filter media and a filter media that is essentially identical in composition but not fabricated according to the foam forming method.

The filter media may have any of a variety of suitable mean flow pore sizes. In some embodiments, for example, the filter media has a mean flow pore size of greater than or equal to 0.1 micrometers, greater than or equal to 0.5 micrometers, greater than or equal to 1 micrometer, greater than or equal to 5 micrometers, greater than or equal to 10 micrometers, greater than or equal to 20 micrometers, greater than or equal to 30 micrometers, or greater than or equal to 40 micrometers. In certain embodiments, the filter media has a mean flow pore size of less than or equal to 50 micrometers, less than or equal to 40 micrometers, less than or equal to 30 micrometers, less than or equal to 20 micrometers, less than or equal to 10 micrometers, less than or equal to 5 micrometers, less than or equal to 1 micrometer, or less than or equal to 0.5 micrometers. Combinations of the above recited ranges are possible (e.g., the filter media has a mean flow pore size of greater than or equal to 0.1 micrometers and less than or equal to 50 micrometers, the filter media has a mean flow pore size of greater than or equal to 0.5 micrometers and less than or equal to 40 micrometers). Other ranges are also possible.

The mean flow pore size of the filter media may be determined in accordance with ASTM F316 (2003).

The filter media may have any of a variety of suitable maximum pore diameters. In some embodiments, for example, the filter media has a maximum pore diameter of greater than or equal to 8 micrometers, greater than or equal to 10 micrometers, greater than or equal to 20 micrometers, greater than or equal to 30 micrometers, or greater than or equal to 40 micrometers. In certain embodiments, the filter media has a maximum pore diameter of less than or equal to 50 micrometers, less than or equal to 40 micrometers, less than or equal to 30 micrometers, less than or equal to 20 micrometers, or less than or equal to 10 micrometers. Combinations of the above recited ranges are possible (e.g., the filter media has a maximum pore diameter of greater than or equal to 8 micrometers and less than or equal to 50 micrometers, the filter media has a maximum pore diameter of greater than or equal to 10 micrometers and less than or equal to 40 micrometers). Other ranges are also possible.

The maximum pore diameter of the filter media may be determined using a liquid with a known surface tension to determine bubble breakthrough through the filter media and back calculating the maximum pore diameter. In certain embodiments, for example, the maximum pore diameter is determined by: (i) applying isopropyl alcohol to a first surface of the filter media comprising a plurality of pores; (ii) applying pressurized air to a second surface of the filter media that is substantially opposite the first surface; (iii) allowing the pressurized air to pass through the plurality of pores and create one or more bubbles; and (iv) calculating the maximum pore diameter using the surface tension of isopropyl alcohol, a conversion factor of isopropyl alcohol, and the pressure of the pressurized air.

The filter media may have any of a variety of suitable many pores diameters. As used herein, the many pores diameter is the average pore diameter of the filter media. In certain embodiments, for example, the filter media has a many pores diameter of greater than or equal to 3 micrometers, greater than or equal to 5 micrometers, greater than or equal to 10 micrometers, greater than or equal to 20 micrometers, greater than or equal to 30 micrometers, greater than or equal to 40 micrometers, greater than or equal to 50 micrometers, greater than or equal to 60 micrometers, or greater than or equal to 70 micrometers. In some embodiments, the filter media has a many pores diameter of less than or equal to 80 micrometers, less than or equal to 70 micrometers, less than or equal to 60 micrometers, less than or equal to 50 micrometers, less than or equal to 40 micrometers, less than or equal to 30 micrometers, less than or equal to 20 micrometers, less than or equal to 10 micrometers, or less than or equal to 4 micrometers. Combinations of the above recited ranges are possible (e.g., the filter media has a many pores diameter of greater than or equal to 3 micrometers and less than or equal to 80 micrometers, the filter media has a many pores diameter of greater than or equal to 5 micrometers and less than or equal to 60 micrometers). Other ranges are also possible.

The many pores diameter of the filter media may be determined using a liquid with a known surface tension to determine bubble breakthrough through the filter media and back calculating the many pores diameter. In certain embodiments, for example, the many pores diameter is determined by: (i) applying isopropyl alcohol to a first surface of the filter media comprising a plurality of pores; (ii) applying pressurized air to a second surface of the filter media that is substantially opposite the first surface; (iii) allowing the pressurized air to pass through the plurality of pores and create one or more bubbles; and (iv) calculating the many pores diameter using the surface tension of isopropyl alcohol, a conversion factor of isopropyl alcohol, and the pressure of the pressurized air.

The filter media may have any of a variety of suitable air permeabilities. In certain embodiments, for example, the filter media has an air permeability of greater than or equal to 1 l/m$^2$s, greater than or equal to 1.5 l/m$^2$s, greater than or equal to 5 l/m$^2$s, greater than or equal to 100 l/m$^2$s, greater than or equal to 500 l/m$^2$s, greater than or equal to 1000 l/m$^2$s, greater than or equal to 1500 l/m$^2$s, greater than or equal to 2000 l/m$^2$s, greater than or equal to 2500 l/m$^2$s, greater than or equal to 3000 l/m$^2$s, greater than or equal to 3500 l/m$^2$s, greater than or equal to 4000 l/m$^2$s, or greater than or equal to 4500 l/m$^2$s. In some embodiments, the filter media has an air permeability of less than or equal to 5000 l/m$^2$s, less than or equal to 4500 l/m$^2$s, less than or equal to 4000 l/m$^2$s, less than or equal to 3500 l/m$^2$s, less than or equal to 3000 l/m$^2$s, less than or equal to 2500 l/m$^2$s, less than or equal to 2000 l/m$^2$s, less than or equal to 1500 l/m$^2$s, less than or equal to 1000 l/m$^2$s, less than or equal to 500 l/m$^2$s, less than or equal to 100 l/m$^2$s, or less than or equal to 1.5 l/m$^2$s. Combinations of the above recited ranges are possible (e.g., the filter media has an air permeability of greater than or equal to 1 l/m$^2$s and less than or equal to 5000 l/m$^2$s, the filter media has an air permeability of greater than or equal to 1.5 l/m$^2$s and less than or equal to 3500 l/m$^2$s). Other ranges are also possible.

The air permeability of the filter media may be determined in accordance with EN/ISO 9237 (A=20 cm$^2$).

The filter media may have any of a variety of suitable air permeability increases after impregnation (e.g., solvent saturation). In certain embodiments, for example, the filter media has an air permeability increase after impregnation of greater than or equal to 5%, greater than or equal to 10%, greater than or equal to 50%, greater than or equal to 100%, greater than or equal to 150%, greater than or equal to 200%, greater than or equal to 250%, greater than or equal to 300%, greater than or equal to 350%, greater than or equal to 400%, or greater than or equal to 450%. In some embodiments, the filter media has an air permeability increase after impregnation of less than or equal to 500%, less than or equal to 450%, less than or equal to 400%, less than or equal to 350%, less than or equal to 300%, less than or equal to 250%, less than or equal to 200%, less than or equal to 150%, less than or equal to 100%, less than or equal to 50%, or less than or equal to 10%. Combinations of the above recited ranges are possible (e.g., the filter media has an air permeability increase after impregnation of greater than or equal to 5% and less than or equal to 500%, the filter media has an air permeability increase after impregnation of greater than or equal to 10% and less than or equal to 250%). Other ranges are also possible.

The air permeability increase after impregnation of the filter media may be determined in accordance with EN/ISO 9237 (A=20 cm$^2$)

The filter media may have any of a variety of suitable dust holding capacities according to ISO 19438 (2013). In certain embodiments, for example, the filter media has a DHC of greater than or equal to 10 g/m$^2$, greater than or equal to 50 g/m$^2$, greater than or equal to 100 g/m$^2$, greater than or equal to 200 g/m$^2$, greater than or equal to 300 g/m$^2$, greater than or equal to 400 g/m$^2$, greater than or equal to 500 g/m$^2$, greater than or equal to 600 g/m$^2$, greater than or equal to 700 g/m$^2$, greater than or equal to 800 g/m$^2$, or greater than or equal to 900 g/m$^2$ as measured by ISO 19438 (2013). In some embodiments, the filter media has a DHC of less than or equal to 1000 g/m$^2$, less than or equal to 900 g/m$^2$, less than or equal to 800 g/m$^2$, less than or equal to 700 g/m$^2$, less than or equal to 600 g/m$^2$, less than or equal to 500 g/m$^2$, less than or equal to 400 g/m$^2$, less than or equal to 300 g/m$^2$, less than or equal to 200 g/m$^2$, less than or equal to 100 g/m$^2$, or less than or equal to 50 g/m$^2$ as measured by ISO 19438 (2013). Combinations of the above recited ranges are possible (e.g., the filter media has a DHC of greater than or equal to 10 g/m$^2$ and less than or equal to 1000 g/m$^2$ as measured by ISO 19438 (2013), the filter media has a DHC of greater than or equal to 400 g/m$^2$ and less than or equal to 500 g/m$^2$ as measured by ISO 19438 (2013)). Other ranges are also possible.

References herein to the DHC as measured according to ISO 19438 (2013) refer to the injected DHC. In other words, the ranges provided above relate to the injected DHC of the filter media as measured according to ISO 19438 (2013). This measurement may be performed according to ISO 19438-MTD (2013) or ISO 19438-FTD (2013). In other words, in some embodiments, a filter media has a DHC in one or more of the ranges identified in the previous paragraph measured according to ISO 19438-MTD (2013) and/or has a DHC in one or more of the ranges identified in the previous paragraph measured according to ISO 19438-FTD (2013). ISO 19438-MTD (2013) comprises using ISO medium test dust (A3), a face velocity of 0.06 cm/s, and a 50 mg/L BUGL. ISO 19438-FTD (2013) comprises using ISO fine test dust (A2), a face velocity of 0.06 cm/s, and a 25 mg/mL BUGL. DHC, when measured according to ISO 19438-FTD (2013) or ISO 19438-MTD (2013), is measured when the pressure drop across the fiber web reaches 100 kPa.

The filter media may have any of a variety of suitable dust holding capacities according to ISO 4020 (2001). In certain embodiments, for example, the filter media has a DHC of greater than or equal to 10 g/m$^2$, greater than or equal to 50 g/m$^2$, greater than or equal to 100 g/m$^2$, greater than or equal to 200 g/m$^2$, greater than or equal to 300 g/m$^2$, greater than or equal to 400 g/m$^2$, greater than or equal to 500 g/m$^2$, greater than or equal to 600 g/m$^2$, greater than or equal to 700 g/m$^2$, greater than or equal to 800 g/m$^2$, or greater than or equal to 900 g/m$^2$ as measured by ISO 4020 (2001). In some embodiments, the filter media has a DHC of less than or equal to 1000 g/m$^2$, less than or equal to 900 g/m$^2$, less than or equal to 800 g/m$^2$, less than or equal to 700 g/m$^2$, less than or equal to 600 g/m$^2$, less than or equal to 500 g/m$^2$, less than or equal to 400 g/m$^2$, less than or equal to 300 g/m$^2$, less than or equal to 200 g/m$^2$, less than or equal to 100 g/m$^2$, or less than or equal to 50 g/m$^2$ as measured by ISO 4020 (2001). Combinations of the above recited ranges are possible (e.g., the filter media has a DHC of greater than or equal to 10 g/m$^2$ and less than or equal and less than or equal to 1000 g/m$^2$ as measured by ISO 4020 (2001), the filter media has a DHC of greater than or equal to 400 g/m$^2$ and less than or equal to 500 g/m$^2$ as measured by ISO 4020 (2001)). Other ranges are also possible.

References herein to DHC as measured according to ISO 4020 (2001) refer to the captured DHC. In other words, the ranges provided above relate to the captured DHC of the filter media as measured according to ISO 4020 (2001). The measurement may comprise using mineral oil having a kinematic viscosity of 5 mm$^2$/s at 25° C. in which organic and inorganic contaminants are dispersed. The organic and inorganic contaminants are carbon black and ISO 12103-2 M2 aluminum oxide particles, respectively. The mineral oil may be passed through the filter media at a temperature of 25° C. and a face velocity of 0.033 cm/s, and the DHC may be measured when the pressure drop across the fiber web reaches 70 kPa above the initial pressure drop.

The filter media may have any of a variety of suitable dust holding capacities according to ISO 16889 (2008). In certain embodiments, for example, the filter media has a DHC of greater than or equal to 10 g/m$^2$, greater than or equal to 50 g/m$^2$, greater than or equal to 100 g/m$^2$, greater than or equal to 200 g/m$^2$, greater than or equal to 300 g/m$^2$, greater than or equal to 400 g/m$^2$, greater than or equal to 500 g/m$^2$, greater than or equal to 600 g/m$^2$, greater than or equal to 700 g/m$^2$, greater than or equal to 800 g/m$^2$, or greater than or equal to 900 g/m$^2$ as measured by ISO 16889 (2008). In some embodiments, the filter media has a DHC of less than or equal to 1000 g/m$^2$, less than or equal to 900 g/m$^2$, less than or equal to 800 g/m$^2$, less than or equal to 700 g/m$^2$, less than or equal to 600 g/m$^2$, less than or equal to 500 g/m$^2$, less than or equal to 400 g/m$^2$, less than or equal to 300 g/m$^2$, less than or equal to 200 g/m$^2$, less than or equal to 100 g/m$^2$, or less than or equal to 50 g/m$^2$ as measured by ISO 16889 (2008). Combinations of the above recited ranges are possible (e.g., the filter media has a DHC of greater than or equal to 10 g/m$^2$ and less than or equal and less than or equal to 1000 g/m$^2$ as measured by ISO 16889 (2008), the filter media has a DHC of greater than or equal to 400 g/m$^2$ and less than or equal to 500 g/m$^2$ as measured by ISO 16889 (2008)). Other ranges are also possible.

References herein to DHC as measured according to ISO 16889 (2008) refer to the injected DHC. In other words, the ranges provided above relate to the injected DHC of the filter media as measured according to ISO 16889 (2008). This DHC may be measured according to ISO 16889 (2008) (modified by testing a flat sheet sample) on a Multipass Filter Test Stand manufactured by FTI. The measurement may comprise using Aviation Hydraulic Fluid AERO HFA MIL H-5606A manufactured by Mobil in which ISO medium test dust (A3) is dispersed at a 10 mg/L BUGL. The Aviation Hydraulic Fluid may be passed through the filter media at a face velocity of 0.41 cm/s, and the DHC may be measured when the pressure drop across the fiber web reaches 200 kPa above the initial pressure drop.

The filter media may have any of a variety of suitable dust holding capacities according to ISO 5011 (2000). In certain embodiments, for example, the filter media has a DHC of greater than or equal to 10 g/m$^2$, greater than or equal to 50 g/m$^2$, greater than or equal to 100 g/m$^2$, greater than or equal to 200 g/m$^2$, greater than or equal to 300 g/m$^2$, greater than or equal to 400 g/m$^2$, greater than or equal to 500 g/m$^2$, greater than or equal to 600 g/m$^2$, greater than or equal to 700 g/m$^2$, greater than or equal to 800 g/m$^2$, or greater than or equal to 900 g/m$^2$ as measured by ISO 5011 (2000). In some embodiments, the filter media has a DHC of less than or equal to 1000 g/m$^2$, less than or equal to 900 g/m$^2$, less than or equal to 800 g/m$^2$, less than or equal to 700 g/m$^2$, less than or equal to 600 g/m$^2$, less than or equal to 500 g/m$^2$, less than or equal to 400 g/m$^2$, less than or equal to 300 g/m$^2$, less than or equal to 200 g/m$^2$, less than or equal to 100 g/m$^2$, or less than or equal to 50 g/m$^2$ as measured by ISO 5011 (2000). Combinations of the above recited ranges are also possible (e.g., the filter media has a DHC of greater than or equal to 10 g/m$^2$ and less than or equal and less than or equal to 1000 g/m$^2$ as measured by ISO 5011 (2000), the filter media has a DHC of greater than or equal to 400 g/m$^2$ and less than or equal to 500 g/m$^2$ as measured by ISO 5011 (2000)). Other ranges are also possible.

The filter media may have any of a variety of suitable dust holding capacities according to ISO 16890 (2016). In certain embodiments, for example, the filter media has a DHC of greater than or equal to 10 g/m$^2$, greater than or equal to 50 g/m$^2$, greater than or equal to 100 g/m$^2$, greater than or equal to 200 g/m$^2$, greater than or equal to 300 g/m$^2$, greater than or equal to 400 g/m$^2$, greater than or equal to 500 g/m$^2$, greater than or equal to 600 g/m$^2$, greater than or equal to 700 g/m$^2$, greater than or equal to 800 g/m$^2$, or greater than or equal to 900 g/m$^2$ as measured by ISO 16890 (2016). In some embodiments, the filter media has a DHC of less than or equal to 1000 g/m$^2$, less than or equal to 900 g/m$^2$, less than or equal to 800 g/m$^2$, less than or equal to 600 g/m$^2$, less than or equal to 500 g/m$^2$, less than or equal to 400 g/m$^2$, less than or equal to 300 g/m$^2$, less than or equal to 200 g/m$^2$, less than or equal to 100 g/m$^2$, or less than or equal to 50 g/m$^2$ as measured by ISO 16890 (2016). Combinations of the above recited ranges are possible (e.g., the filter media has a DHC of greater than or equal to 10 g/m$^2$ and less than or equal and less than or equal to 1000 g/m$^2$ as measured by ISO 16890 (2016), the filter media has a DHC of greater than or equal to 400 g/m$^2$ and less than or equal to 500 g/m$^2$ as measured by ISO 16890 (2016)). Other ranges are also possible.

References herein to DHC as measured according to ISO 5011 (2000) and ISO 16890 (2016) refer to the captured DHC. In other words, the ranges provided in the preceding two paragraphs relate to the captured DHC of the filter media as measured according to ISO 5011 (2000) and ISO 16890 (2016). These measurements may comprise using air in which ISO fine test dust (A2) is dispersed. The air may be supplied at 20° C. and a relative humidity of 55%, and may be passed through the non-woven fiber web at face velocities of 11.1 cm/s for ISO 5011 (2000) and 5.3 cm/s for ISO 16890 (2016). The dust holding capacity may be measured when the pressure drop across the fiber web reaches 2 kPa for ISO 5011 (2000) and 300 Pa for ISO 16890 (2016).

The filter media may have any of a variety of suitable specific dust holding capacities. As used herein, the specific DHC is a measurement of the DHC that incorporates the specific thickness of the filter media per filtration area. Without wishing to be bound by theory, the filter media may have a decreased fiber mass as compared to a filter media that is essentially identical in composition but not fabricated according to the foam forming method (e.g., a filter media that is essentially identical in composition but fabricated according to a conventional wetlaid process). The decreased fiber mass may, in some embodiments, result in an improved specific DHC due to a lower overall thickness of the filter media as compared to a filter media that is essentially identical in composition but not fabricated according to the foam forming method (e.g., a filter media that is essentially identical in composition but fabricated according to a conventional wetlaid process).

In certain embodiments, the filter media has a specific DHC of greater than or equal to 10 g/m$^2$, greater than or equal to 50 g/m$^2$, greater than or equal to 100 g/m$^2$, greater than or equal to 200 g/m$^2$, greater than or equal to 300 g/m$^2$, greater than or equal to 400 g/m$^2$, greater than or equal to 500 g/m$^2$, greater than or equal to 600 g/m$^2$, greater than or equal to 700 g/m$^2$, greater than or equal to 800 g/m$^2$, or greater than or equal to 900 g/m$^2$. In some embodiments, the filter media has a specific DHC of less than or equal to 1000 g/m$^2$, less than or equal to 900 g/m$^2$, less than or equal to 800 g/m$^2$, less than or equal to 700 g/m$^2$, less than or equal to 600 g/m$^2$, less than or equal to 500 g/m$^2$, less than or equal to 400 g/m$^2$, less than or equal to 300 g/m$^2$, less than or equal to 200 g/m$^2$, less than or equal to 100 g/m$^2$, or less than or equal to 50 g/m$^2$. Combinations of the above recited ranges are possible (e.g., the filter media has a specific DHC of greater than or equal to 10 g/m$^2$ and less than or equal and less than or equal to 1000 g/m$^2$, the filter media has a specific DHC of greater than or equal to 400 g/m$^2$ and less than or equal to 500 g/m$^2$). Other ranges are also possible.

In certain embodiments the specific DHC of the filter media may be determined in accordance with ISO 19438 (2013), ISO 4020 (2001), ISO 16889 (2008), ISO 5011 (2000), and/or ISO 16890 (2016), each of which are described herein in further detail with respect to the DHC of the filter media. In other words, the ranges provided in the preceding paragraph relate to the specific DHC of the filter media as measured according to ISO 19438 (2013), ISO 4020 (2001), ISO 16889 (2008), ISO 5011 (2000), and/or ISO 16890 (2016).

The filter media may have any of a variety of suitable gas/liquid separation performances. In some embodiments, for example, the filter media has a gas/liquid separation performance of less than or equal to 20 mg/m$^3$ liquid separation, less than or equal to 10 mg/m$^3$ liquid separation, less than or equal to 5 mg/m$^3$ liquid separation, less than or equal to 1 mg/m$^3$ liquid separation, less than or equal to 0.01 mg/m$^3$ liquid separation, less than or equal to 0.001 mg/m$^3$ liquid separation, or less than or equal to 0.0001 mg/m$^3$ liquid separation. In certain embodiments, the filter media has a gas/liquid separation performance of greater than or equal to 0.00001 mg/m$^3$ liquid separation, greater than or equal to 0.0001 mg/m$^3$ liquid separation, greater than or equal to 0.001 mg/m$^3$ liquid separation, greater than or equal to 0.01 mg/m$^3$ liquid separation, greater than or equal to 0.1 mg/m$^3$ liquid separation, greater than or equal to 1 mg/m$^3$ liquid separation, greater than or equal to 5 mg/m$^3$ liquid separation, or greater than or equal to 10 mg/m$^3$ liquid separation. Combinations of the above recited ranges are possible (e.g., the filter media has a gas/liquid separation performance of less than or equal to 20 mg/m$^3$ liquid separation and greater than or equal to 0.00001 mg/m$^3$ liquid separation, the filter media has a gas/liquid separation performance of less than or equal to 1 mg/m$^3$ liquid separation and greater than or equal to 0.01 mg/m$^3$ liquid separation). Other ranges are also possible.

The gas/liquid separation performance of the filter media may be determined in accordance with ISO 12500. In some embodiments, the measurement is performed by applying a gas with a liquid aerosol with a defined concentration per m$^3$ of gas onto the filter media and measuring the separation performance of the liquid particles from gaseous flow.

The filter media may have any of a variety of suitable fuel/water separation performances according to SAEJ1488. In certain embodiments, for example, the filter media has a fuel/water separation performance of greater than or equal to 15% water retention, greater than or equal to 20% water retention, greater than or equal to 30% water retention, greater than or equal to 40% water retention, greater than or equal to 50% water retention, greater than or equal to 60% water retention, greater than or equal to 70% water retention, greater than or equal to 80% water retention, greater than or equal to 90% water retention, greater than or equal to 95% water retention, or greater than or equal to 99% water retention as measured by SAEJ1488. In some embodiments, the filter media has a fuel/water separation performance of less than or equal to 99.9% water retention, less than or equal to 99% water retention, less than or equal to 90% water retention, less than or equal to 80% water retention, less than or equal to 70% water retention, less than or equal to 60% water retention, less than or equal to 50% water retention, less than or equal to 40% water retention, less than or equal to 30% water retention, or less than or equal to 20% water retention as measured by SAEJ1488. Combinations of the above recited ranges are possible (e.g., the filter media has a fuel/water separation performance of greater than or equal to 15% water retention and less than or equal to 99.9% water retention as measured by SAEJ1488, the filter media has a fuel/water separation performance of greater than or equal to 60% and less than or equal to 70% water retention as measured by SAEJ1488). Other ranges are also possible.

As described above, the fuel/water separation performance of the filter media may be determined in accordance with SAEJ1488. In certain embodiments, the measurement is performed by applying a mixture of diesel with a defined water content (2000 ppm) onto the filter media and measuring the effective water retention of the filter media by a Karl-Fischer titration methodology at a defined droplet size of 10-150 micrometers and an interfacial tension (IFT) between water and diesel of 10-20.

The filter media may have any of a variety of suitable fuel/water separation performances according to ISO 16332 (2018). In certain embodiments, for example, the filter media has a fuel/water separation performance of greater than or equal to 15% water retention, greater than or equal to 20% water retention, greater than or equal to 30% water retention, greater than or equal to 40% water retention, greater than or equal to 50% water retention, greater than or equal to 60% water retention, greater than or equal to 70% water retention, greater than or equal to 80% water retention, greater than or equal to 90% water retention, greater than or equal to 95% water retention, or greater than or equal to 99% water retention as measured by ISO 16332 (2018). In some embodiments, the filter media has a fuel/water separation performance of less than or equal to 99.9% water retention, less than or equal to 99% water retention, less than or equal to 90% water retention, less than or equal to 80% water retention, less than or equal to 70% water retention, less than or equal to 60% water retention, less than or equal to 50% water retention, less than or equal to 40% water retention, less than or equal to 30% water retention, or less than or equal to 20% water retention as measured by ISO 16332 (2018). Combinations of the above recited ranges are possible (e.g., the filter media has a fuel/water separation performance of greater than or equal to 15% water retention and less than or equal to 99.9% water retention as measured by ISO 16332 (2018), the filter media has a fuel/water separation performance of greater than or equal to 60% and less than or equal to 70% water retention as measured by ISO 16332 (2018)). Other ranges are also possible.

As described above, the fuel/water separation performance of the filter media may be determined in accordance with ISO 16332 (2018). In certain embodiments, the measurement may be performed for a pressure side fuel/water separator using fine droplets. In other embodiments, the measurement may be performed for a suction side fuel/water separator using coarse droplets.

According to certain embodiments, a resin may be applied to the filter media. In some embodiments, the resin advantageously provides strength and durability to the filter media and/or flexibility for pleating of the filter media.

Any of a variety of suitable resins may be employed. In certain embodiments, for example, the resin comprises polyesters, poly(olefin)s, vinyl compounds (e.g., acrylics, styrenated acrylics, vinyl acetates, vinyl acrylics, poly(styrene acrylate), poly(acrylate)s, poly(vinyl alcohol), poly(ethylene vinyl acetate), poly(ethylene vinyl chloride), styrene butadiene rubber, poly(vinyl chloride), poly(vinyl alcohol) derivatives), poly(urethane), poly(amide)s, poly(nitrile)s, elastomers, natural rubber, urea formaldehyde, melamine formaldehyde, phenol formaldehyde, epoxy based resins, starch polymers, and/or combinations thereof. It should be understood that other resin compositions may also be suitable as the disclosure is not meant to be limiting in this regard. In some embodiments, the resin may be a thermoset and, in some embodiments, a thermoset/thermoplastic combination. The resin may be in the form of a latex such as a water-based emulsion. In some embodiments, the resin may be in the form of a dispersion, powder, hot melt, and/or solution.

The filter media may have any of a variety of suitable media resin contents. In some embodiments, for example, the filter media has a media resin content of greater than or equal to 2%, greater than or equal to 5%, greater than or equal to 10%, greater than or equal to 15%, greater than or equal to 20%, greater than or equal to 25%, greater than or equal to 30%, or greater than or equal to 35%. In certain embodiments, the filter media has a media resin content of less than or equal to 40%, less than or equal to 35%, less than or equal to 30%, less than or equal to 25%, less than or equal to 20%, less than or equal to 15%, less than or equal to 10%, or less than or equal to 5%. Combinations of the above recited ranges are possible (e.g., the filter media has a media resin content of greater than or equal to 2% and less than or equal to 40%, the filter media has a resin content of greater than or equal to 5% and less than or equal to 35%). Other ranges are also possible.

The media resin content may be determined by calculating the weight of filter media before and after resin saturation.

The filter media may have any of a variety of suitable basis weights. In some embodiments, for example, the filter media has a basis weight of greater than or equal to 10 $g/m^2$, greater than or equal to 20 $g/m^2$, greater than or equal to 50 $g/m^2$, greater than or equal to 100 $g/m^2$, greater than or equal to 200 $g/m^2$, greater than or equal to 300 $g/m^2$, or greater than or equal to 400 $g/m^2$. In certain embodiments, the filter media has a basis weight of less than or equal to 500 $g/m^2$, less than or equal to 400 $g/m^2$, less than or equal to 300 $g/m^2$, less than or equal to 200 $g/m^2$, less than or equal to 100 $g/m^2$, less than or equal to 50 $g/m^2$, or less than or equal to 20 $g/m^2$. Combinations of the above recited ranges are possible (e.g., the filter media has a basis weight of greater than or equal to 10 $g/m^2$ and less than or equal to 500 $g/m^2$, the filter media has a basis weight of greater than or equal to 20 $g/m^2$ and less than or equal to 400 $g/m^2$). Other ranges are also possible.

The basis weight of the filter media may be determined in accordance with ISO 536:2012.

As explained in greater detail herein, the fiber web formed by the foam forming method may be fabricated into a filter media comprising the fiber web. In some embodiments, the filter media may comprise one or more additional layers. The one or more additional layers may advantageously provide support to the fiber web and/or enhance the gas and/or liquid filtration and/or separation of the filter media. In some embodiments, the one or more additional layers may be formed by the foam forming method. In other embodiments, the one or more additional layers are not formed by the foam forming method (e.g., the one or more additional layers may be formed by a conventional wetlaid process). The one or more additional layers may comprise a plurality of pores such that the one or more additional layers are capable of filtering and/or separating gases and/or liquids.

The filter media may comprise any of a variety of suitable additional layers. In some embodiments, for example, the filter media comprises greater than or equal to 1 additional layer, greater than or equal to 2 additional layers, greater than or equal to 5 additional layers, or greater than or equal to 10 additional layers. In certain embodiments, the filter media comprises less than or equal to 15 additional layers, less than or equal to 10 additional layers, less than or equal to 5 additional layers, or less than or equal to 1 additional layer. Combinations of the above recited ranges are possible (e.g., the filter media comprises greater than or equal to 1 additional layer and less than or equal to 15 additional layers, the filter media comprises greater than or equal to 2 additional layers and less than or equal to 10 additional layers). Other ranges are also possible.

The filter media may have any of a variety of suitable thicknesses. In some embodiments, the filter media has a thickness of greater than or equal to 0.1 mm, greater than or equal to 0.5 mm, greater than or equal to 1 mm, greater than or equal to 2 mm, greater than or equal to 3 mm, or greater than or equal to 4 mm. In certain embodiments, the filter media has a thickness of less than or equal to 5 mm, less than or equal to 4 mm, less than or equal to 3 mm, less than or equal to 1 mm, or less than or equal to 0.5 mm. Combinations of the above recited ranges are possible (e.g., the filter media has a thickness of greater than or equal to 0.1 mm and less than or equal to 5 mm, the filter media has a thickness of greater than or equal to 0.5 mm and less than or equal to 4 mm). Other ranges are also possible.

The thickness of the filter media may be determined in accordance with ISO 534 (2011) at 2 N/cm$^2$.

The following examples are intended to illustrate certain embodiments of the present disclosure, but do not exemplify the full scope of the disclosure.

Example 1

This example describes the pore permeability indexes of foam laid filter media.

Figure 3:
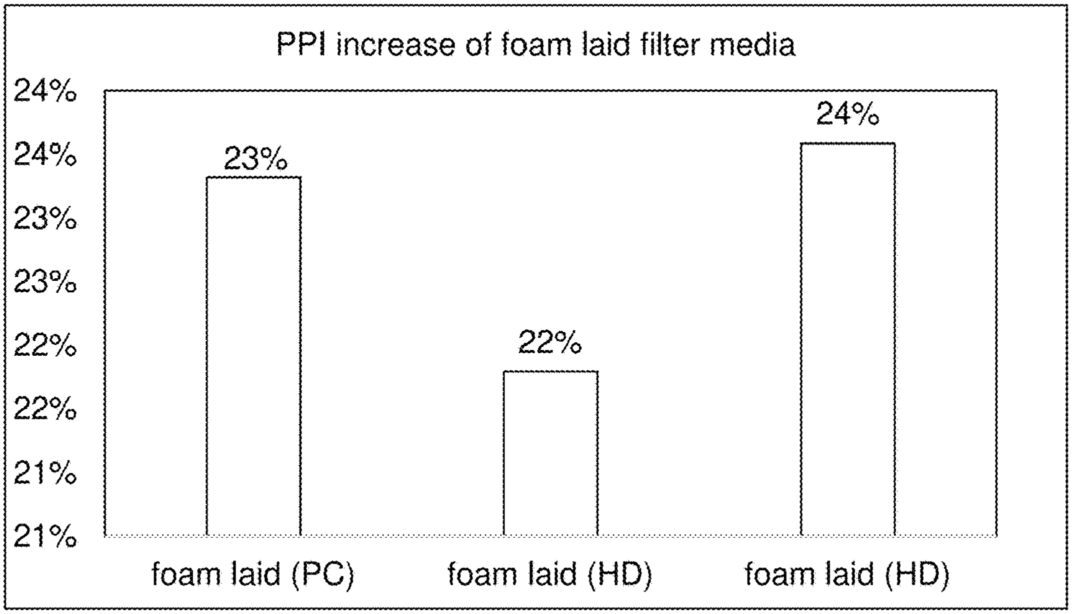
FIG. 3 shows, according to some embodiments, the pore permeability index (PPI) increase of a foam laid filter media as compared to a conventional wetlaid filter media.

Three foam laid filter media were fabricated according to the foam forming method described herein. The foam laid filter media were used in passenger car (PC) and heavy duty (HD) air (e.g., truck) applications. Each of the foam laid filter media displayed a greater than 20% increase in PPI as compared to filter media that are essentially identical in composition but fabricated according to a conventional wetlaid process. See FIG. 3.

Example 2

This example describes the DHC, specific DHC, and filtration performance of a foam laid filter media.

Figure 4:
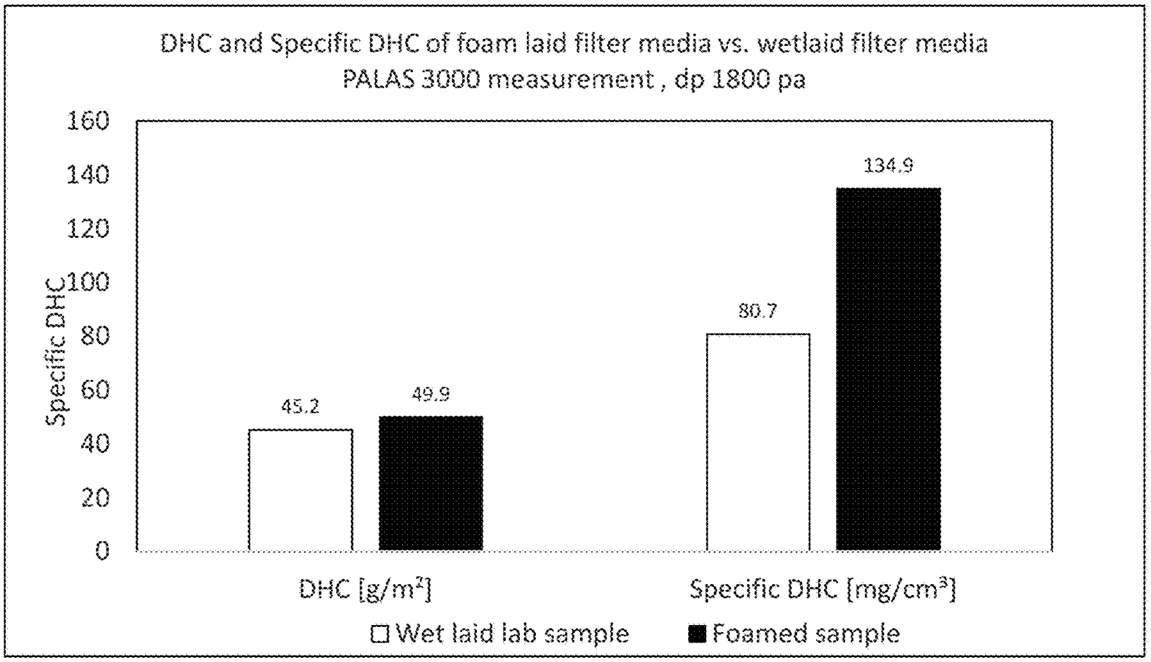
FIG. 4 shows, according to some embodiments, the dust holding capacity (DHC) and specific DHC of a foam laid filter media as compared to a conventional wetlaid filter media.

A foam laid filter media was fabricated according to the foam forming method described herein. The foam laid filter media displayed a greater than 10% increase in DHC as compared to a filter media that is essentially identical in composition but fabricated according to a conventional wetlaid process. The foam laid filter media also displayed a greater than 67% increase in specific DHC as compared to the filter media that is essentially identical in composition but fabricated according to a conventional wetlaid process. See FIG. 4.

Figure 5:
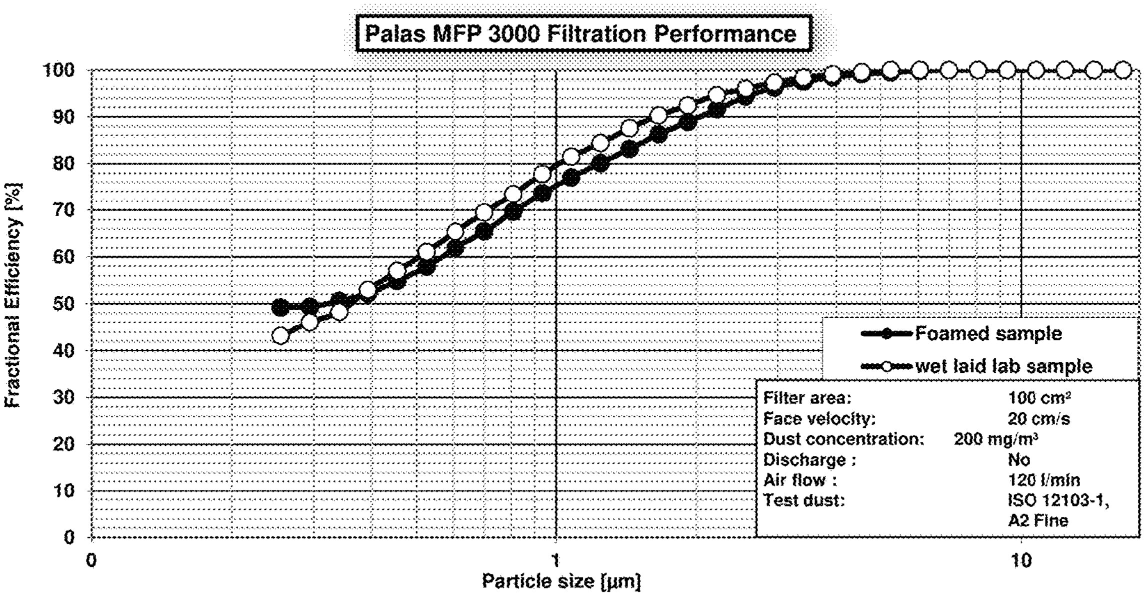
FIG. 5 shows, according to some embodiments, the filtration performance of a foam laid filter media as compared to a conventional wetlaid filter media.

The foam laid filter media also displayed a comparable fractional efficiency as compared to the filter media that is essentially identical in composition but fabricated according to a conventional wetlaid process. See FIG. 5. The foam laid filter media therefore has improved DHC and specific DHC while maintaining factional efficiency as compared to a filter media that is essentially identical in composition but fabricated according to a conventional wetlaid process.

Example 3

This example describes the air permeability of a foam laid filter media.

Figure 6:
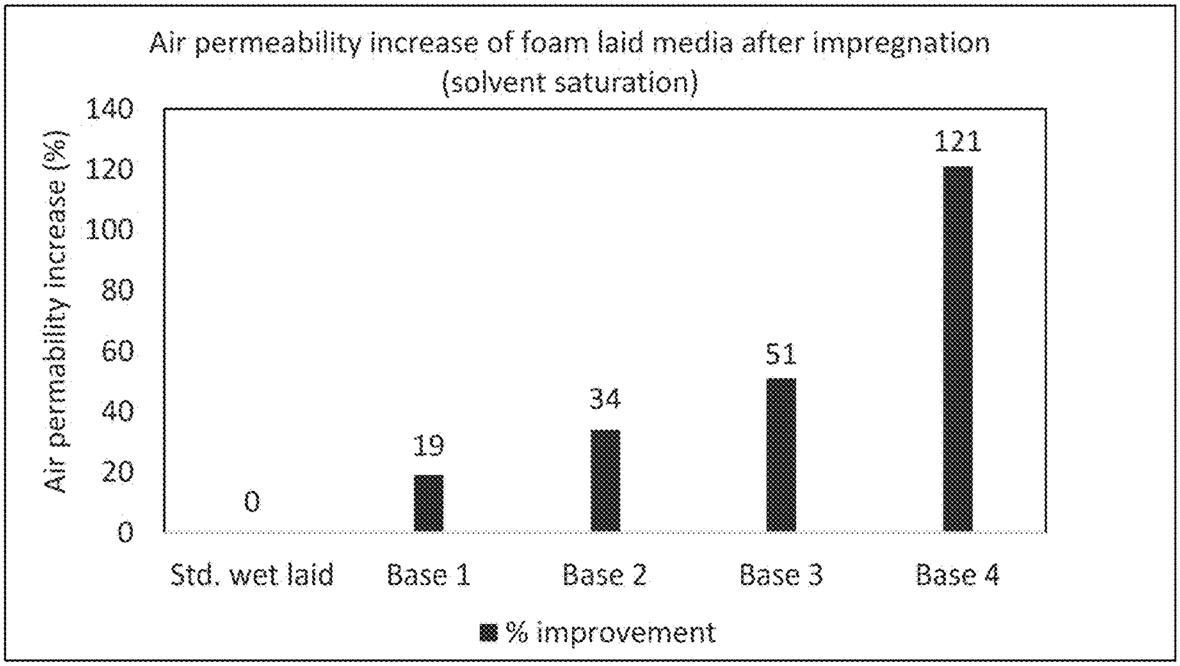
FIG. 6 shows, according to some embodiments, the air permeability increase of a foam laid filter media after impregnation as compared to a conventional wetlaid filter media.

Four foam laid filter media were fabricated according to the foam forming method described herein. Depending on the composition of the fiber web, the foam laid filter media displayed between a greater than or equal to 19% and less than or equal to 121% increase in air permeability as compared to a filter media that is essentially identical in composition but fabricated according to a conventional wetlaid process. See FIG. 6.

Example 4

This example describes the pore size distribution of a foam laid filter media.

Figure 7A:
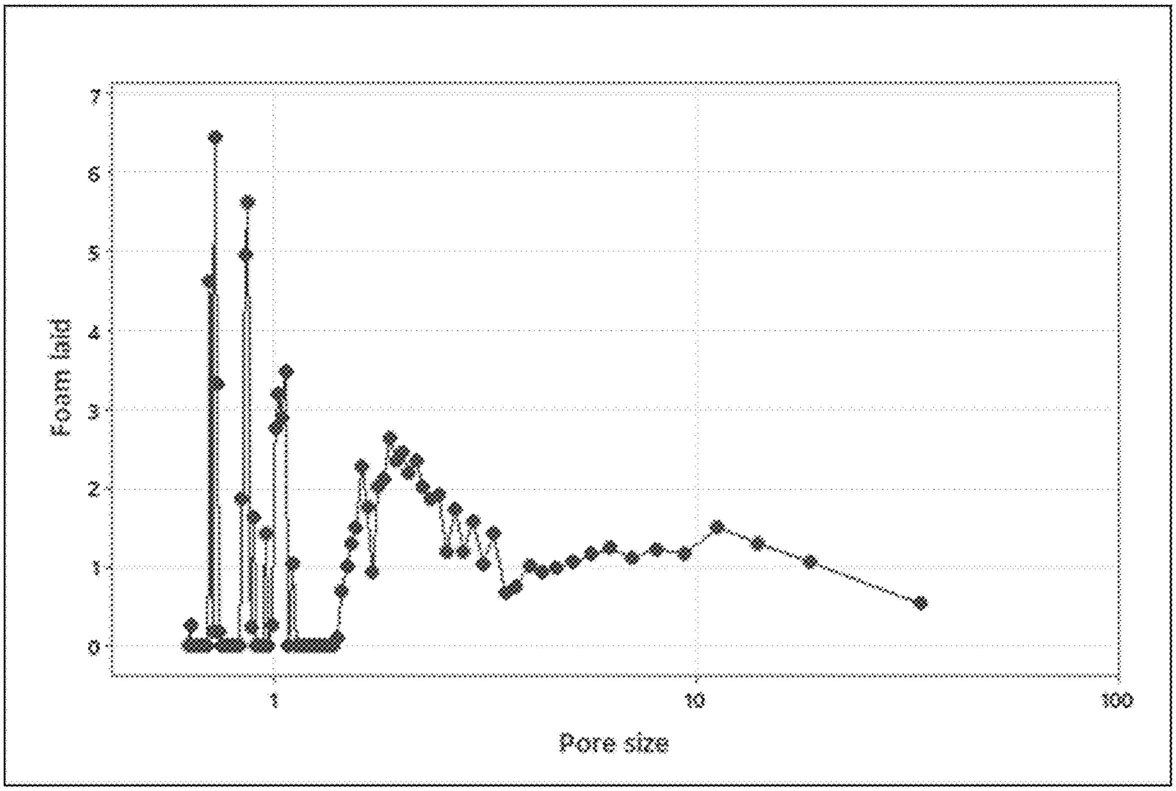
FIG. 7A shows, according to some embodiments, the pore size distribution of a foam laid filter media.
Figure 7B:
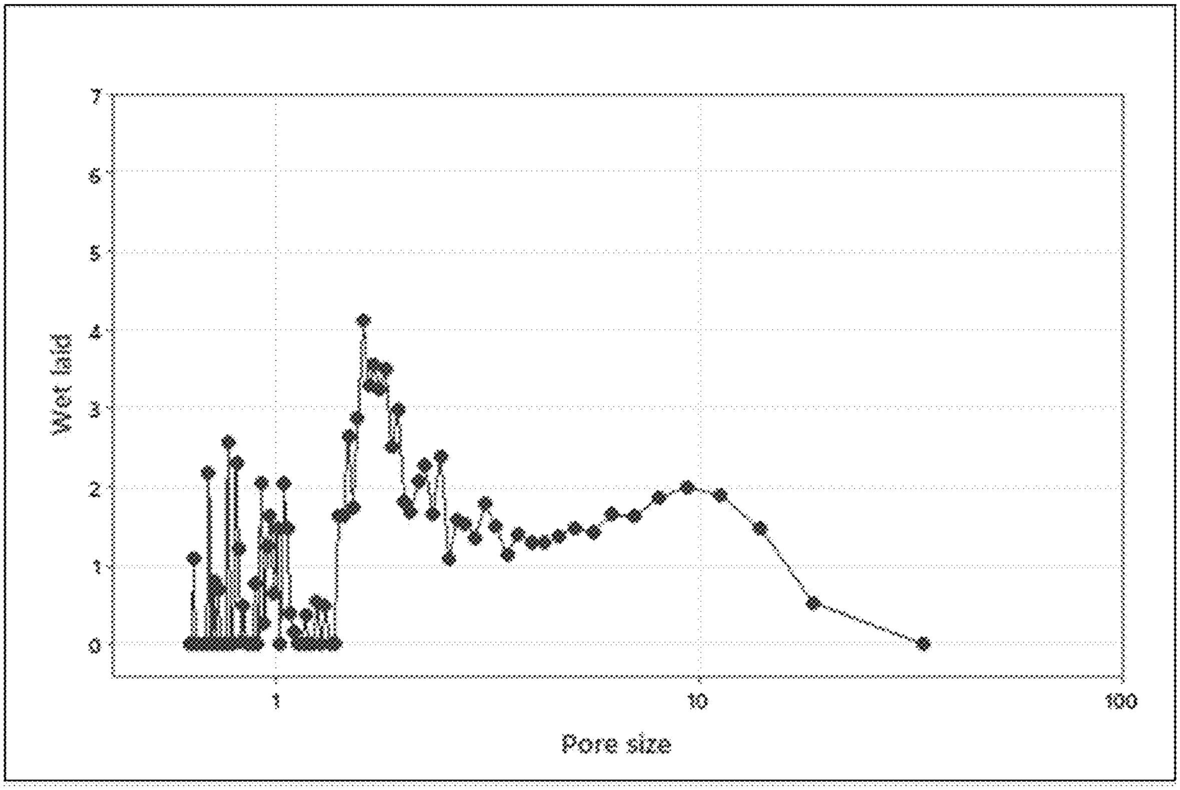
FIG. 7B shows, according to some embodiments, the pore size distribution of a conventional wetlaid filter media.

A foam laid filter media was fabricated according to the foam forming method described herein. The pore size distribution of the foam laid filter media was determined, and 37% of pores of the filter media had an average size less than 1 micrometer (see FIG. 7A), as compared to 19% of pores of a filter media that is essentially identical in composition but fabricated according to a conventional wetlaid process (see FIG. 7B).

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an." as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B." when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of." or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either." "one of." "only one of." or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B." or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, "wt. %" is an abbreviation of weight percentage.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying." "having." "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A filter media, comprising:
a fiber web comprising a plurality of pores,
wherein the filter media has a pore permeability index (PPI) of greater than or equal to 0.2 and less than or equal to 4.0, and wherein greater than or equal to 15% of pores of the plurality of pores have an average size of less than or equal to 1 micrometer.

2. The filter media of claim 1, wherein the PPI of the filter media is greater than or equal to 0.3 and less than or equal to 3.5.

3. The filter media of claim 1, wherein greater than or equal to 20% of the pores of the plurality of pores have the average size of less than or equal to 1 micrometer.

4. The filter media of claim 1, wherein less than or equal to 50% of the pores of the plurality of pores have the average size of less than or equal to 1 micrometer.

5. The filter media of claim 1, wherein the fiber web is a non-woven fiber web.

6. The filter media of claim 1, wherein the fiber web comprises cellulose fibers, nanocellulose fibers, microfibrillated cellulose fibrils, synthetic fibers, glass fibers, lyocell fibers, polyvinyl alcohol fibers, bicomponent fibers, tricomponent fibers, and/or combinations thereof.

7. The filter media of claim 1, wherein the fiber web comprises one or more binders.

8. The filter media of claim 7, wherein the one or more binders comprise an acrylic, phenolic, melamine, epoxy, polyester, and/or particle binder.

9. The filter media of claim 1, wherein the filter media has a specific dust holding capacity (DHC) of greater than or equal to 10 $g/m^2$ and less than or equal to 1000 $g/m^2$.

10. The filter media of claim 1, wherein the filter media has a gas/liquid separation performance of less than or equal to 10 $mg/m^3$ liquid.

11. The filter media of claim 1, wherein the filter media has a fuel/water separation performance of greater than or equal to 5% water retention.

12. The filter media of claim 1, wherein the filter media has an air permeability of greater than or equal to 1 $l/m^2s$ and less than or equal to 5000 $l/m^2s$.

13. The filter media of claim 12, wherein the air permeability of the filter media is greater than or equal to 1.5 $l/m^2s$ and less than or equal to 3500 $l/m^2s$.

14. The filter media of claim 1, wherein the filter media has a thickness of greater than or equal to 0.1 mm and less than or equal to 3 mm.

15. The filter media of claim 1, wherein the filter media is a gas and/or a liquid filtration and/or separation media.

16. The filter media of claim 1, wherein greater than or equal to 30% of the pores of the plurality of pores have the average size of less than or equal to 1 micrometer.

17. The filter media of claim 1, wherein the filter media has a dust holding capacity (DHC) of greater than or equal to 50 $g/m^2$ as measured by ISO 19438.

18. The filter media of claim 1, wherein the filter media has a dust holding capacity (DHC) of greater than or equal to 50 $g/m^2$ as measured by ISO 16889.

19. The filter media of claim 1, wherein the filter media has a specific dust holding capacity (DHC) of greater than or equal to 50 $g/m^2$ as measured by ISO 5011.

20. The filter media of claim 1, wherein the filter media has a specific dust holding capacity (DHC) of greater than or equal to 50 $g/m^2$ as measured by ISO 4020.

21. The filter media of claim 1, wherein the filter media is fabricated according to a foam forming process, and wherein the filter media has a dust holding capacity (DHC) value that is at least 10% greater than a filter media that is essentially identical in composition but fabricated according to a wetlaid process.

* * * * *